US010531070B2

(12) United States Patent
Urey et al.

(10) Patent No.: US 10,531,070 B2
(45) Date of Patent: Jan. 7, 2020

(54) DUAL FUNCTION DISPLAY AND MULTI-VIEW IMAGING SYSTEM

(71) Applicant: KOC Universitesi, Istanbul (TR)

(72) Inventors: Hakan Urey, Istanbul (TR); Shoaib Soomro, Istanbul (TR); Muhsin Eralp, Istanbul (TR)

(73) Assignee: KOC Universitesi, Istanbul (TR)

( * ) Notice: Subject to any disclaimer, the term of this patent is extended or adjusted under 35 U.S.C. 154(b) by 34 days.

(21) Appl. No.: 15/780,770

(22) PCT Filed: Dec. 7, 2015

(86) PCT No.: PCT/TR2015/050231
§ 371 (c)(1),
(2) Date: Jun. 1, 2018

(87) PCT Pub. No.: WO2017/099675
PCT Pub. Date: Jun. 15, 2017

(65) Prior Publication Data
US 2019/0098286 A1 Mar. 28, 2019

(51) Int. Cl.
H04N 13/225 (2018.01)
G02B 27/01 (2006.01)
(Continued)

(52) U.S. Cl.
CPC ........... *H04N 13/225* (2018.05); *G02B 5/128* (2013.01); *G02B 27/0172* (2013.01);
(Continued)

(58) Field of Classification Search
CPC .. H04N 13/225; H04N 13/282; H04N 13/363; H04N 13/351; H04N 7/144;
(Continued)

(56) References Cited

U.S. PATENT DOCUMENTS

2001/0010555 A1 8/2001 Driscoll, Jr.
2003/0156187 A1 8/2003 Gluckman et al.
(Continued)

FOREIGN PATENT DOCUMENTS

EP 0 581 221 A1 2/1994
EP 2 624 041 A1 8/2013
(Continued)

OTHER PUBLICATIONS

International Search Report and Written Opinion, dated Sep. 29, 2016, pp. 1-21, issued in International Application No. PCT/TR2015/050231, European Patent Office, Rijswijk, The Netherlands.
(Continued)

*Primary Examiner* — Allen C Wong
(74) *Attorney, Agent, or Firm* — Brinks Gilson & Lione

(57) ABSTRACT

A system is preferably in the form of a wearable system combined with a double-function image display and image capturing screen. The system is intended to be used to display projected images on the screen and capture the 3D ambient using the image formations from the screen by means of a camera. The system more particularly relates to a display and imaging system comprising an image capturing device, a projector assembly and a passive screen, said image capturing device capturing at least one view being formed by the said passive screen in optical communication therewith.

19 Claims, 24 Drawing Sheets

(51) Int. Cl.
*H04N 7/14* (2006.01)
*H04N 13/351* (2018.01)
*H04N 13/363* (2018.01)
*H04N 13/282* (2018.01)
*G02B 5/128* (2006.01)
*G02B 27/22* (2018.01)
*G03B 17/54* (2006.01)
*G03B 21/602* (2014.01)

(52) U.S. Cl.
CPC ........... *G02B 27/225* (2013.01); *G03B 17/54* (2013.01); *G03B 21/602* (2013.01); *H04N 7/144* (2013.01); *H04N 13/282* (2018.05); *H04N 13/351* (2018.05); *H04N 13/363* (2018.05); *G02B 2027/0134* (2013.01); *G02B 2027/0138* (2013.01); *H04N 2213/001* (2013.01)

(58) Field of Classification Search
CPC ............ H04N 2213/001; G03B 21/602; G03B 21/62; G03B 17/54; G02B 27/225; G02B 27/0172; G02B 27/4205; G02B 27/26; G02B 27/2235; G02B 27/2214; G02B 27/0075; G02B 2027/0134; G02B 2027/0138; G02B 5/128; G06T 19/006
USPC .......................................................... 348/49
See application file for complete search history.

(56) References Cited

U.S. PATENT DOCUMENTS

| | | |
|---|---|---|
| 2005/0041286 A1 | 2/2005 | White |
| 2009/0035520 A1 | 2/2009 | Sagar et al. |
| 2010/0188548 A1* | 7/2010 | Robinson ............... H04N 5/222 348/333.01 |
| 2012/0154396 A1 | 6/2012 | Atkins |
| 2013/0038696 A1 | 2/2013 | Ding et al. |
| 2014/0125789 A1 | 5/2014 | Bond et al. |
| 2014/0177051 A1 | 6/2014 | Kopko et al. |
| 2014/0184724 A1 | 7/2014 | Cho |
| 2015/0009573 A1 | 1/2015 | Haneda et al. |
| 2016/0307290 A1* | 10/2016 | Nalluri ..................... G06T 1/60 |
| 2017/0315774 A1* | 11/2017 | Meerbeek ............... G06F 3/011 |

FOREIGN PATENT DOCUMENTS

| | | |
|---|---|---|
| JP | H0537928 A | 2/1993 |
| JP | 2000-075129 A | 3/2000 |
| JP | 2005115243 A | 4/2005 |

OTHER PUBLICATIONS

International Preliminary Report on Patentability, dated Mar. 23, 2018, pp. 1-30, issued in International Application No. PCT/TR2015/050231, European Patent Office, Munich, Germany.

* cited by examiner

Catadioptric Configuration

DUAL FUNCTION DISPLAY AND MULTI-VIEW IMAGING SYSTEM

RELATED APPLICATIONS

The present patent document is a 371 of PCT Application Serial No. PCT/TR2015/050231, filed Dec. 7, 2015, designating the United States and published in English, which is hereby incorporated by reference.

BACKGROUND

1. Technical Field

The present disclosure relates to a system preferably in the form of a wearable system combined with a double-function image display and image capturing screen. The system is intended to be used to display projected images on the screen and capture the 3D ambient using the image formations from the screen by means of a camera.

2. Background

The concept of wearable systems combined with computer generated images is known per se in the technical field of the present disclosure. Head-mounted camera systems interacting with the physical environment in the sense that different views of the environment are rendered is an explored area of study. For instance combination of a multitude of singular views of a real-time scene, so as to be processed by a processing unit and by which an image of the scene with enhanced visual properties is obtainable, is a well-described technique.

BRIEF SUMMARY

However, it is to be noted that capturing a plurality of images of a scene directly viewed by a user and by which multi-perspective imaging can be performed to allow the user to interact with the environment in a more realistic manner is not a problem defined in the field. More particularly, as a basic example, capturing images of the computer users with direct eye contact is not possible as the camera is located outside the display area of the computer. To this end, more sophisticated telepresence or teleconferencing systems use multiple cameras and interpolate the views. Reconstructing 3D views of the user and his environment requires an array of cameras and more sophisticated installments. The latter approach is a very render intensive approach. Array of cameras require complex hardware, fixed installations, and substantial post-detection processing to handle the large sets of data from scans of each camera to register and create arbitrary viewing positions. One of the prior art publications in the technical field may be referred to as US 20130038696, which teaches the ray modeling of multi-view/light-field imaging with single camera and curved mirror array. More particularly, US 20130038696 discloses a system in which a catadioptric camera creates images from a 3D scene by creating ray images defined as 2D arrays of ray-structure picture-elements (ray-xels). Each ray-xel captures light intensity, mirror-reflection location, and mirror-incident light ray direction. A 3D image is then rendered from the ray images by combining the corresponding ray-xels. The catadioptric camera system of US 20130038696 involves a multiplicity of curved mirrors arranged into a mirror array for reflecting a desired 3D scene and a digital imaging system capturing ray images of said curved mirrors, each of said ray images being a two-dimensional array of ray-structure picture-elements (ray-xels). US 20130038696 provides that each respective ray-xel includes a light intensity measure according to a predefined color model, mirror-reflection location coordinates, and mirror-incident ray direction coordinates.

Another prior art publication in the technical field may be referred to as US 2003156187, which discloses catadioptric sensors using one or more planar mirrors to produce rectified stereoscopic images using only one image detector. By combining multiple views using the mirrors, a composite stereo image that is rectified is formed. The document also teaches different configurations of mirrors to generate virtual camera viewpoints.

A further prior art publication in the present technical field is US 2001010555, disclosing a panoramic camera apparatus in the form of a catadioptric camera for wide angle imaging capturing a 360 degree panoramic image. The document describes use of a single camera with spherical or parabolic mirrors. According to an embodiment, the dual-function display and multi-view imaging system described herein, on the other hand, a display unit effective in performing image capturing function is provided. Image capturing function is effected using image formations off the screen of the display unit.

According to an alternative embodiment of the dual-function display and multi-view imaging system, the display unit is capable of simultaneously performing display and image capturing functions in the form of a single screen. Image capturing function being effected using image formations off the screen of the display unit, a head-mounted projection assembly combined with a camera system cooperatively interact with the display and image capturing construct.

In contrast to existing solutions embodying use of one or multiple cameras facing the viewer, the dual-function display and multi-view imaging system provides a set of devices in optical communication with each other in the manner that a single camera affords a multi-view image capture system by which the user himself constitutes the direct object of the scene.

An aspect of the dual-function display and multi-view imaging system is to provide a multi-view image capture system combined with an image capturing screen.

Another aspect of the dual-function display and multi-view imaging system is to provide a wearable system involving a multi-view image capture system combined with an image capturing screen.

A further aspect of the dual-function display and multi-view imaging system is to provide a wearable telepresence system having a multi-view image capture system in optical communication with an image capturing screen forming multi-perspective views of a scene, said multi-view image capture system being in signal communication with an image projecting system, the latter projecting an image on said image capturing screen, the image capturing screen simultaneously functioning as an image display unit.

A still further aspect of the dual-function display and multi-view imaging system is to provide a passive transparent retroreflective (TRR) high gain screen.

A yet still further aspect of the dual-function display and multi-view imaging system is to provide a lens array capturing multi-perspective view of a scene.

BRIEF DESCRIPTION OF THE FIGURES

Accompanying drawings are given solely for the purpose of exemplifying a multi-view imaging system, whose advantages over prior art were outlined above and will be explained in brief hereinafter. The drawings are not meant to delimit the scope of protection nor should they be referred to alone in an effort to interpret the scope without recourse to the technical disclosure herein.

FIG. 7d demonstrates the situation where optical elements are dense (~1mm) in which case the HPO system becomes true 3D (integral imaging).

DETAILED DESCRIPTION

Figure 1:
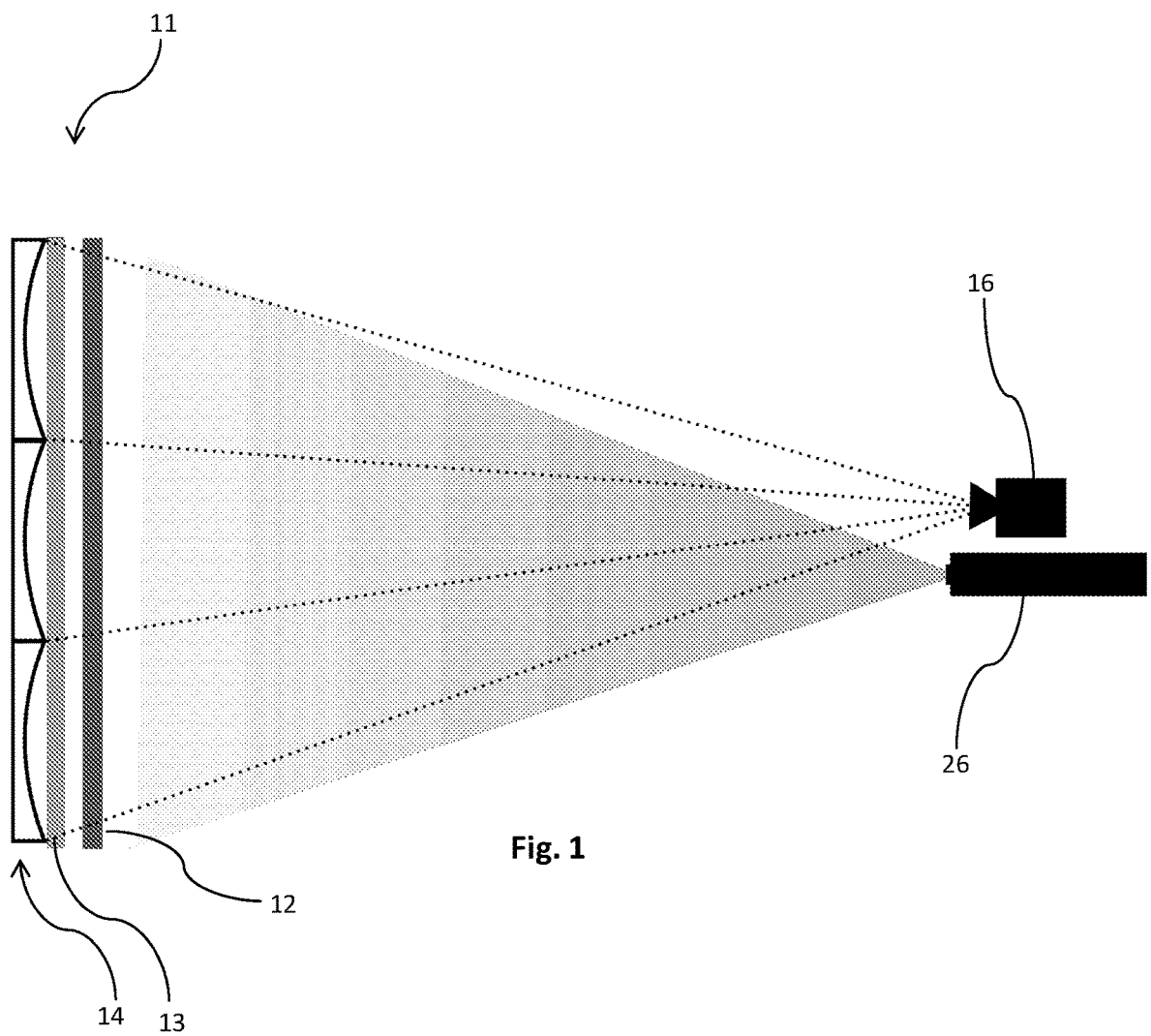
FIG. 1 demonstrates a schematic view of an image capturing system cooperating with an image capturing construct and a projector assembly cooperating with a display layer.
Figure 2:
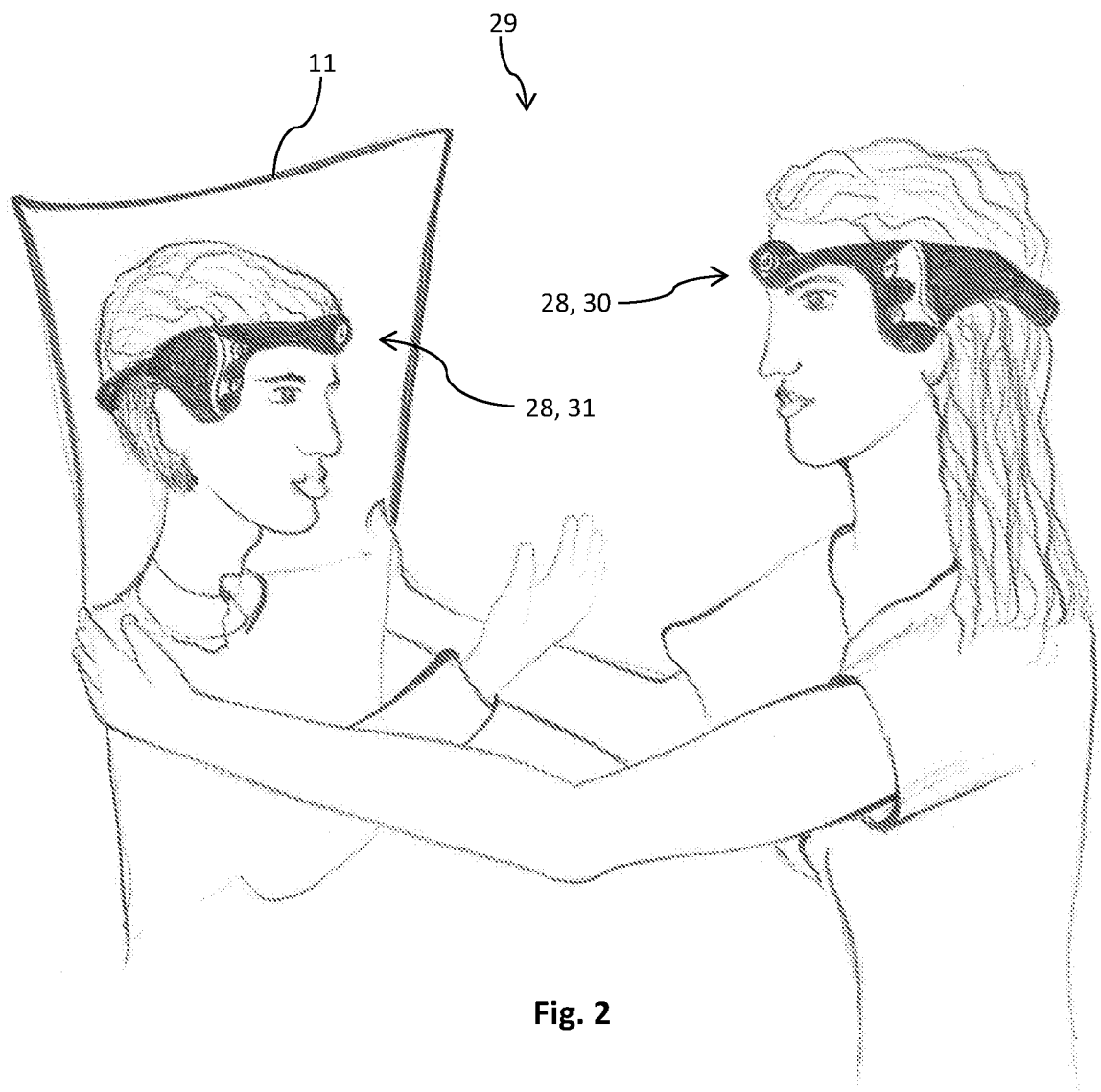
FIG. 2 demonstrates operation of a multi-view imaging system with a passive screen having an image capturing construct as well as a display layer.
Figure 3:
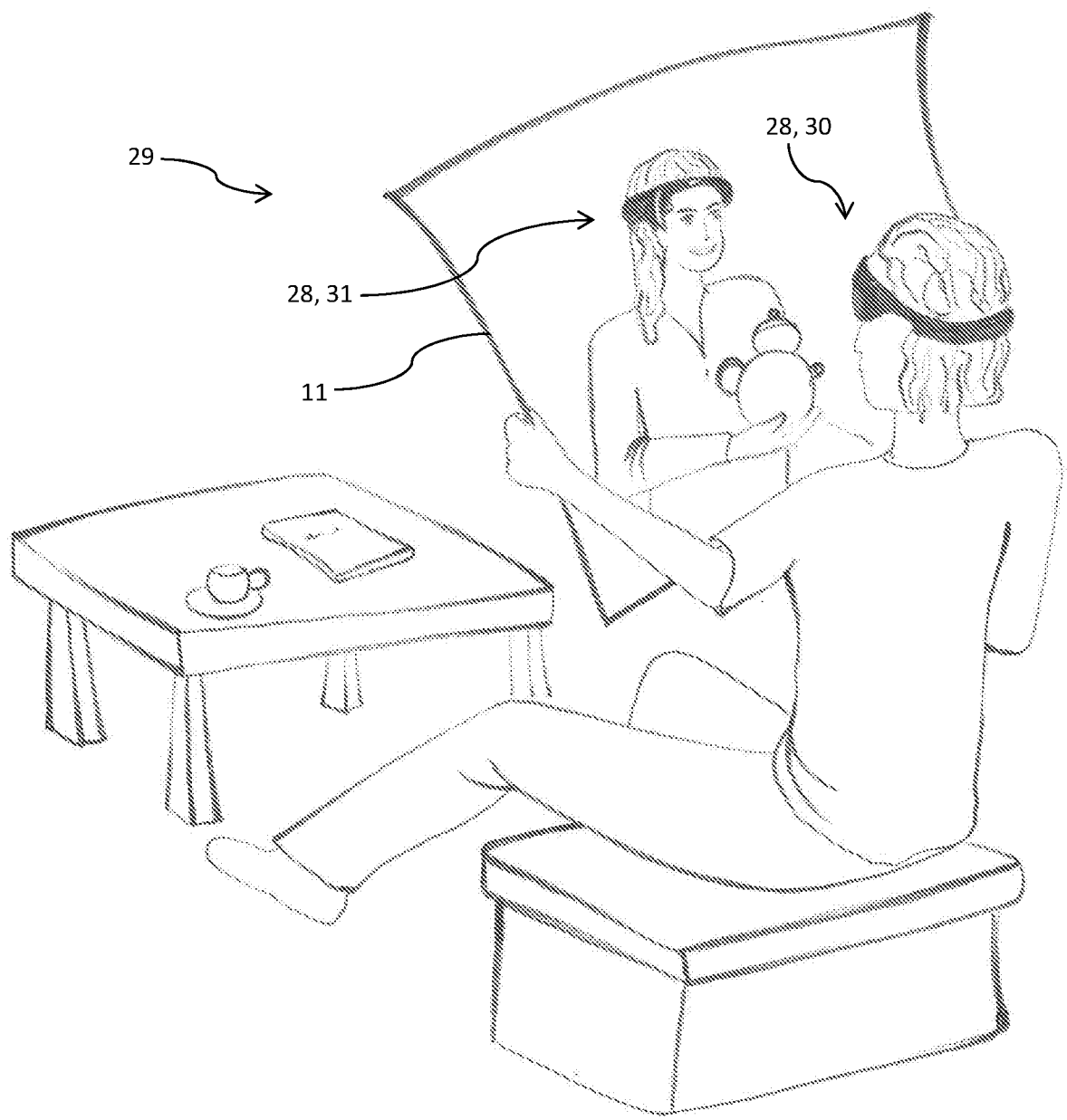
FIG. 3 demonstrates another exemplary view in which the passive screen with the image capturing construct as well as a display layer is operable according to the multi-view imaging system.
Figure 4:
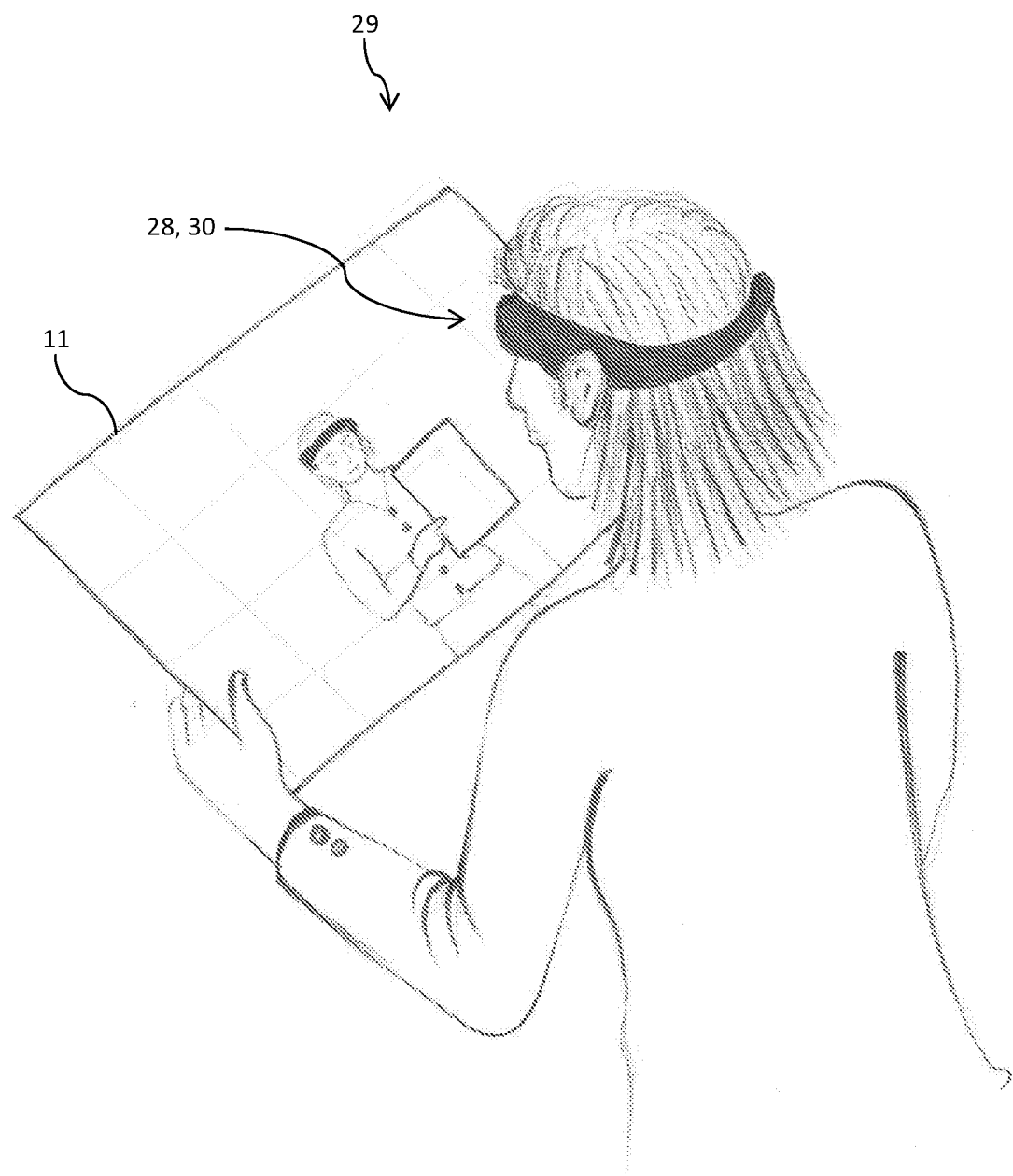
FIG. 4 demonstrates another exemplary view in which the passive screen with the image capturing construct and the display layer is operable.

The following numerals are referred to herein:

11—Passive screen
12—Display layer
13—Blocking layer
14—Imaging layer
15—Screen substrate
16—Image capturing device
17—Display cell
18—Optical element
19—Reflective coating
20—Adhesive layer
21—Microspheres
22—Microspheres reflective coating
23—Transparent protective layer
24—Micro-lens array
25—Optional coating layer
26—Projector assembly
27—Fresnel lens 28—Head-mountable device
29—Telepresence system
30—First telepresence sub-system
31—Second telepresence sub-system
32—Wavelength-selective notch coating
33—Projector unit
34—Beam splitter
35—Diffuser layer According to a preferred embodiment of the multi-view imaging system, an image capturing device (16) is proposed, the image capturing device (16) in the form of a single high-resolution camera optically communicating with a passive screen (11) having an image capturing construct in the form of an imaging layer (14) with a plurality of optical elements (18) optionally in the form of reflective, refractive or diffractive elements. The optical elements (18) to be of use may for instance include reflective, refractive lens arrays, mirror elements or diffractive Fresnel lens (27) arrays, such optical elements (18) making up a generally two-dimensional web as will be delineated hereinafter. Therefore, the optical communication between the passive screen (11) and the image capturing device (16) should be construed such that a multi-perspective view image of a scene is formed by the passive screen's (11) imaging layer (14) and captured by the image capturing device (16). Likewise, a projector assembly (26) projects images on a display layer (12) of the passive screen (11) in optical communication therewith. In other words, image capturing is effectuated by the high-resolution camera while projection is effected by the projector assembly (26) and the passive screen (11) assumes the role of providing both the multi-perspective view image of the scene and displaying the projected images. The passive screen's (11) imaging layer (14) can be provided with an array of optical elements (18) consisting of individual elements altogether functioning as a multi-perspective reflection medium of a scene. To this end, the passive screen's (11) imaging layer (14) can comprise optical elements (18) typically in the form of lens elements, mirror elements or diffractive Fresnel lenses (27).

The passive screen (11) may involve a dioptric or catadioptric configuration. In the dioptric configuration, optical elements (18) in the form of lens elements are separated in discrete steps by a distance equal to or less than the interpupillary distance (IPD). In the case of a catadioptric configuration, optical elements (18) in the form of mirror elements (such as mirrored lens elements) may also be separated in discrete steps by a distance equal to or less than the interpupillary distance (IPD).

It is to be noted that optical elements (18) can be configured to provide full-parallax or single parallax (preferably horizontal-parallax-only) image capturing, in which cases respectively, optical elements (18), for instance mirror elements or lens elements capture perspective images in horizontal and vertical directions or in the horizontal direction. In the case of horizontal-parallax-only configuration, the optical elements (18) are typically structured to extend longitudinally along the vertical axis so as to be neighboring each other on the horizontal direction.

According to an alternative embodiment, the passive screen's (11) imaging layer (14) can be provided with an array of optical elements (18) in the form of a micro-lens array (24) disposed in a denser configuration also effective in multi-perspective image capturing and according to which neighboring micro-lenses are separated in discrete steps by approximately 1 mm. Optical elements (18) as micro-elements also allow dioptric or catadioptric configurations with full-parallax or horizontal-parallax-only imaging options.

The optical elements (18) of the imaging layer (14) in the passive screen (11) are placeable on a screen substrate (15). This array base can be a parabolic base to bring optical axes of the lens elements facing parallel towards to the scene being reflected in a parabolic screen and parallel field of view configuration. Alternatively, a flat screen substrate (15) will provide a flat screen and diverging field of view configuration; likewise a convex substrate will provide a diverging field of view or a spherical concave screen substrate (15) will provide converging field of view allowing toe-in image capturing.

The optical elements (18) of the imaging layer (14) in the passive screen (11) can be a reflective Fresnel lens (27) array, which can be made flexible using polymeric materials. The optical elements (18) preferably have different optical axes. The optical axes of the optical elements (18) are more preferably tilted towards the image capturing device (16) with specified focal lengths and optical power. The optical interaction of the image capturing device (16), i.e. the high-resolution camera, with the passive screen (11) having the imaging layer (14) can be realized in different positionment setups of the camera relative to the passive screen (11). Preferably, the passive screen (11) can be a hand-held medium while the image capturing device (16) is incorporated into a head-mountable device (28). The head-mountable device (28) therefore comprising the image capturing device (16) ensures that the image capturing device (16) can optically communicate with the passive screen (11) in terms of the accuracy of relative positioning with respect to each other and can thereby capture formed images of the scene through the imaging layer (14) while the user wearing the head-mountable device (28) remains the main object of the scene.

Said image capturing device (16) captures perspective views of the scene through image formation on the passive screen (11) as a handheld screen. Alternatively, the passive screen (11) can be used as a wall-mounted device in optical cooperation with an otherwise fixed position image capturing device (16) such as for instance as a table-top device.

Therefore, the operatively coupled image capturing device (16) and the passive screen (11) having the imaging layer (14) provides multi-perspective capturing of a scene irrespective of whether the image capturing device (16) is within a head-mountable device (28) or is a fixed position device. On the other hand, use of a head-mountable device (28) advantageously affords capturing of multi-view images of a scene in which the user himself constitutes the direct object therein and making use of image processing algorithms to synthesize stereo views, the scene is dynamically reconstructed as a sequence of reconstructed images and transferred to a portable image display terminal such as a smartphone or any other image display device, for instance during telepresence sessions.

The head-mountable device (28) also incorporates a high-resolution projector assembly (26), typically a pico-projector combined with the image capturing device (16) within the head-mountable device (28). The projector assembly (26) projects an image on the passive screen (11), the latter additionally having a display layer (12) for effecting displaying of the projected images thereon. Therefore a high-gain (and narrow-angle) or low-gain (and wide-angle) 2D or 3D display is created for the user as will be delineated hereinafter.

The system therefore proposes a head-mountable device (28) unit having a high-resolution image capturing device (16) and a projector assembly (26) with at least one miniaturized projector. In this configuration, the passive screen

(11) assumes the role of a dual-purpose screen, which can simultaneously reflect the multi-perspective views of the scene and display the images as projected by the projector assembly (26). The passive screen (11) preferably displays a sequence of dynamically reconstructed images in the form of a video stream.

The display layer (12) of the passive screen (11) is a separate layer effecting reflecting of the projected image. The display layer (12) is structured in the form of a micro-patterned retroreflective surface as will be delineated hereinafter. Preferably, at least 10% of the screen area of the passive screen (11) is retroreflective and is used as a display layer (12). Preferably, at most 90% of the screen area of the passive screen is used as an imaging layer (14) for perspective image formations. Therefore, the display layer (12) and the imaging layer (14) of the passive screen (11) are two discrete superposed layers or structures separately serving for the purpose of simultaneously displaying the projected images in optical cooperation with the projector assembly (26) and forming multi-perspective views in optical cooperation with the image capturing device (16) respectively. As the two separate layers or structures are superposed one above another, the passive screen's (11) total effective screen area is divided into two separate screen portions in an interpenetrated manner.

Figure 5A:
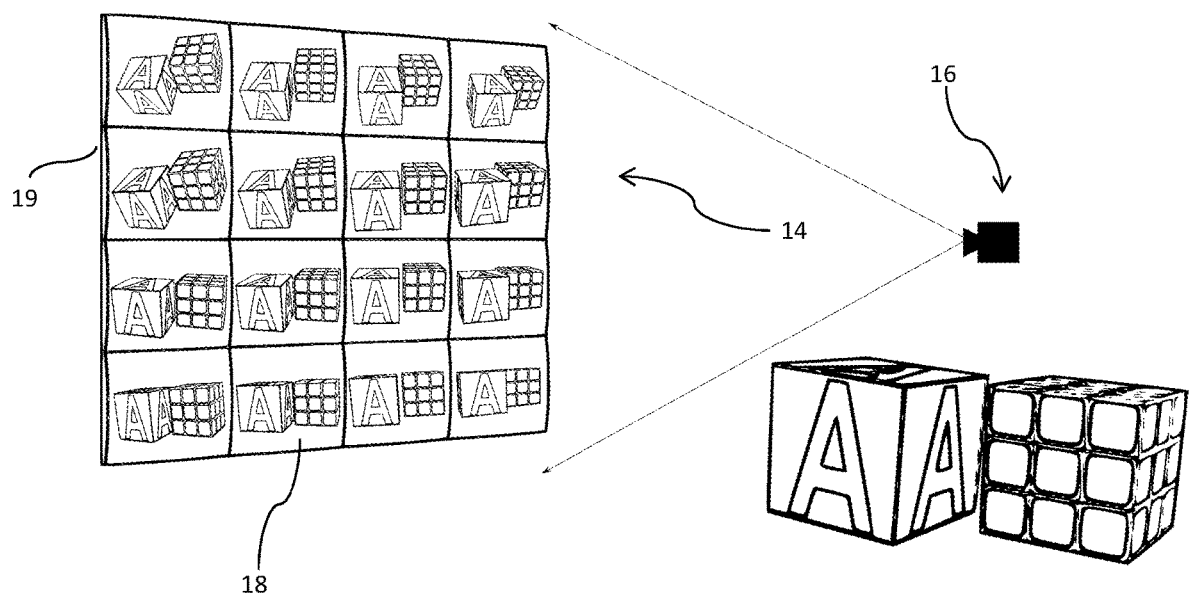
FIG. 5a demonstrates a schematic view of a passive screen with reflective optical elements in front capture setup.
Figure 5B:
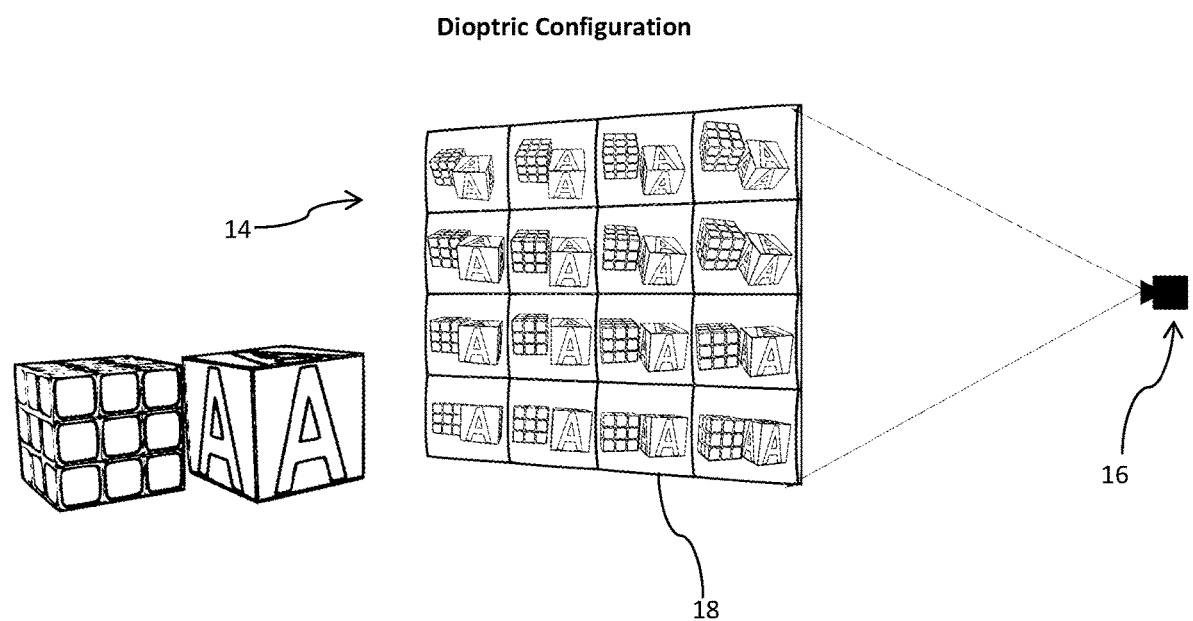
FIG. 5b demonstrates a schematic view of a passive screen with refractive optical elements in rear capture setup.
Figure 5C:
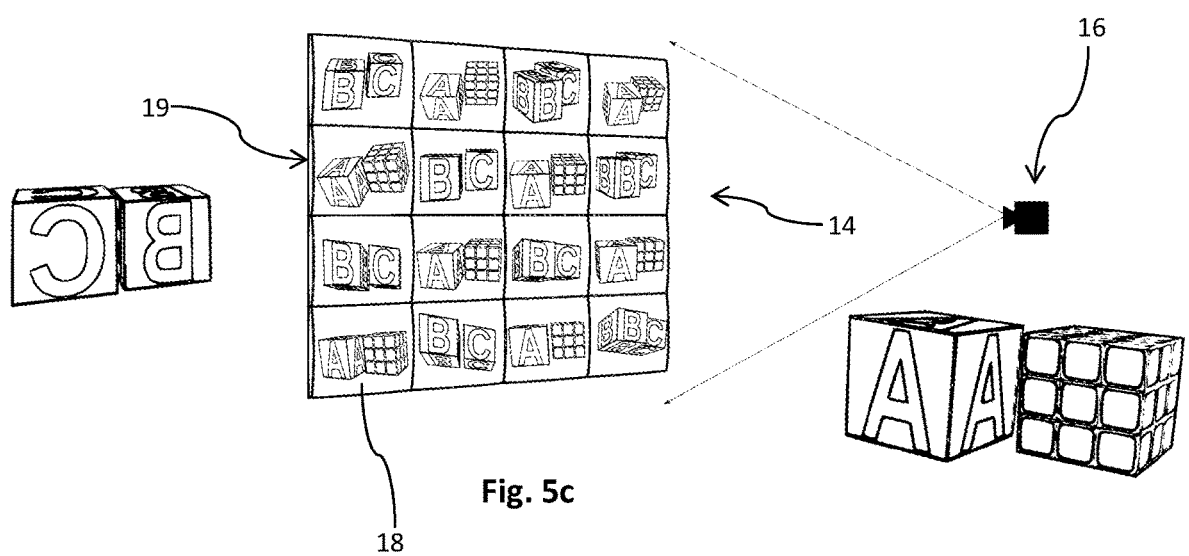
FIG. 5c demonstrates a schematic view of a passive screen with both refractive and reflective optical elements in combined front and rear capture system.
Figure 6A:
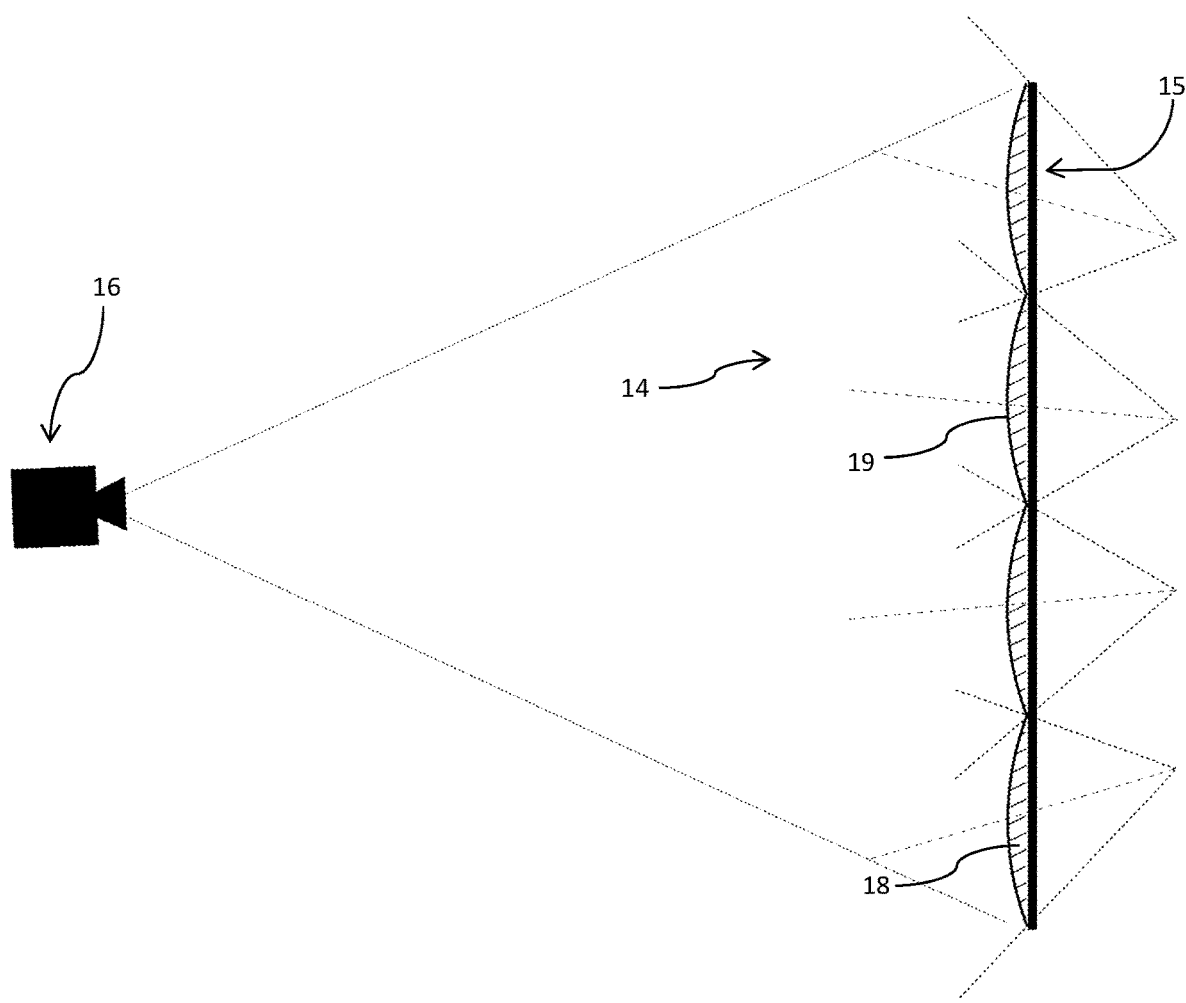
FIGS. 6a, 6b and 6c demonstrate a schematic view of a plane (a), spherical (b), and parabolic (c) passive screen substrate configuration optically communicating with an image capturing device on the left. Elemental axes configuration will respectively be diverging (plane), converging towards image capturing device (spherical concave) and parallel (parabolic).
Figure 6B:
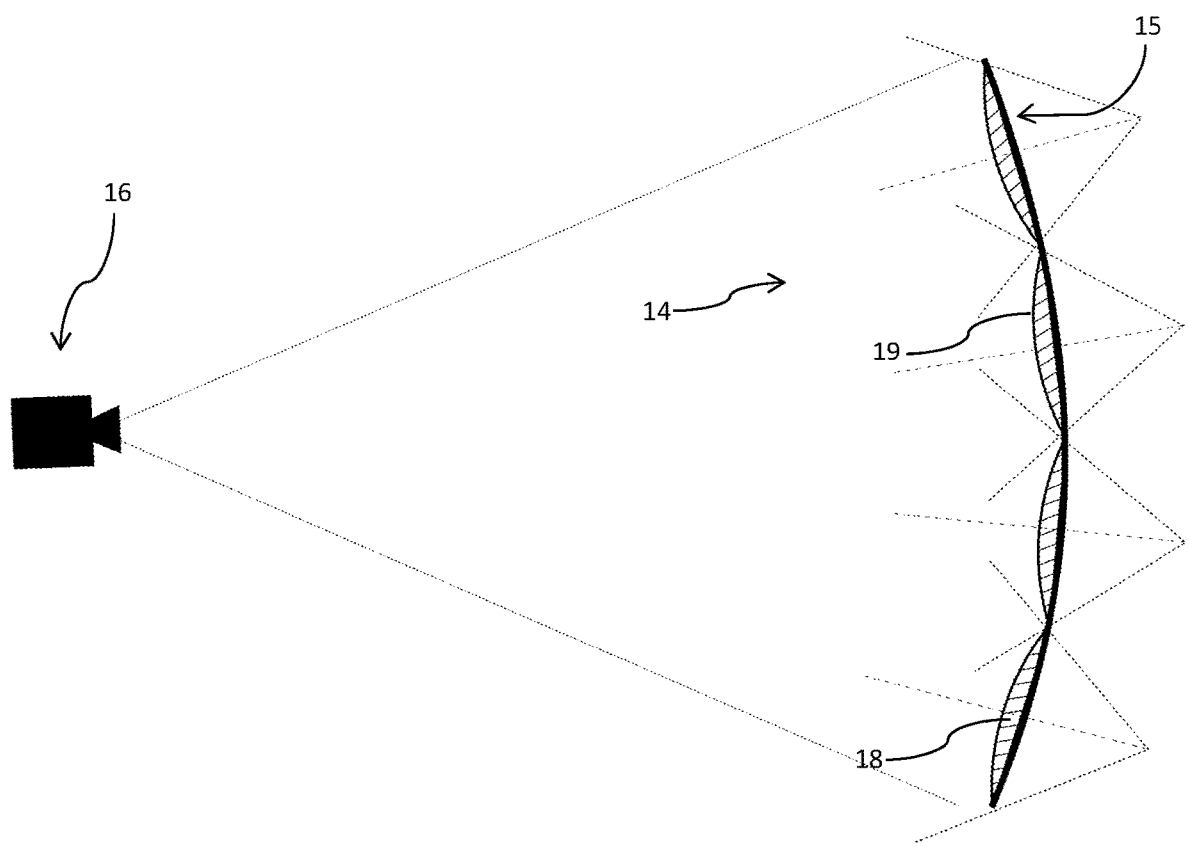
Figure 6C:
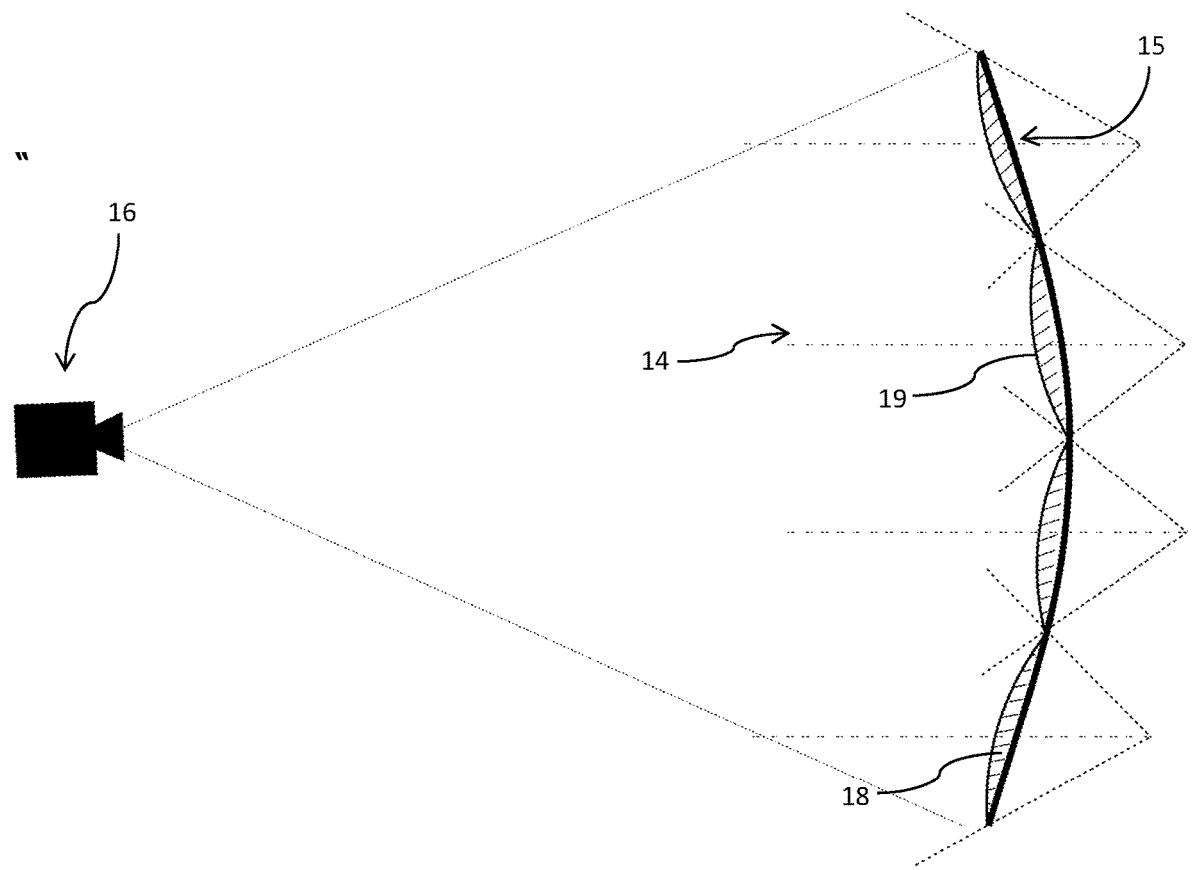
Figure 7A:
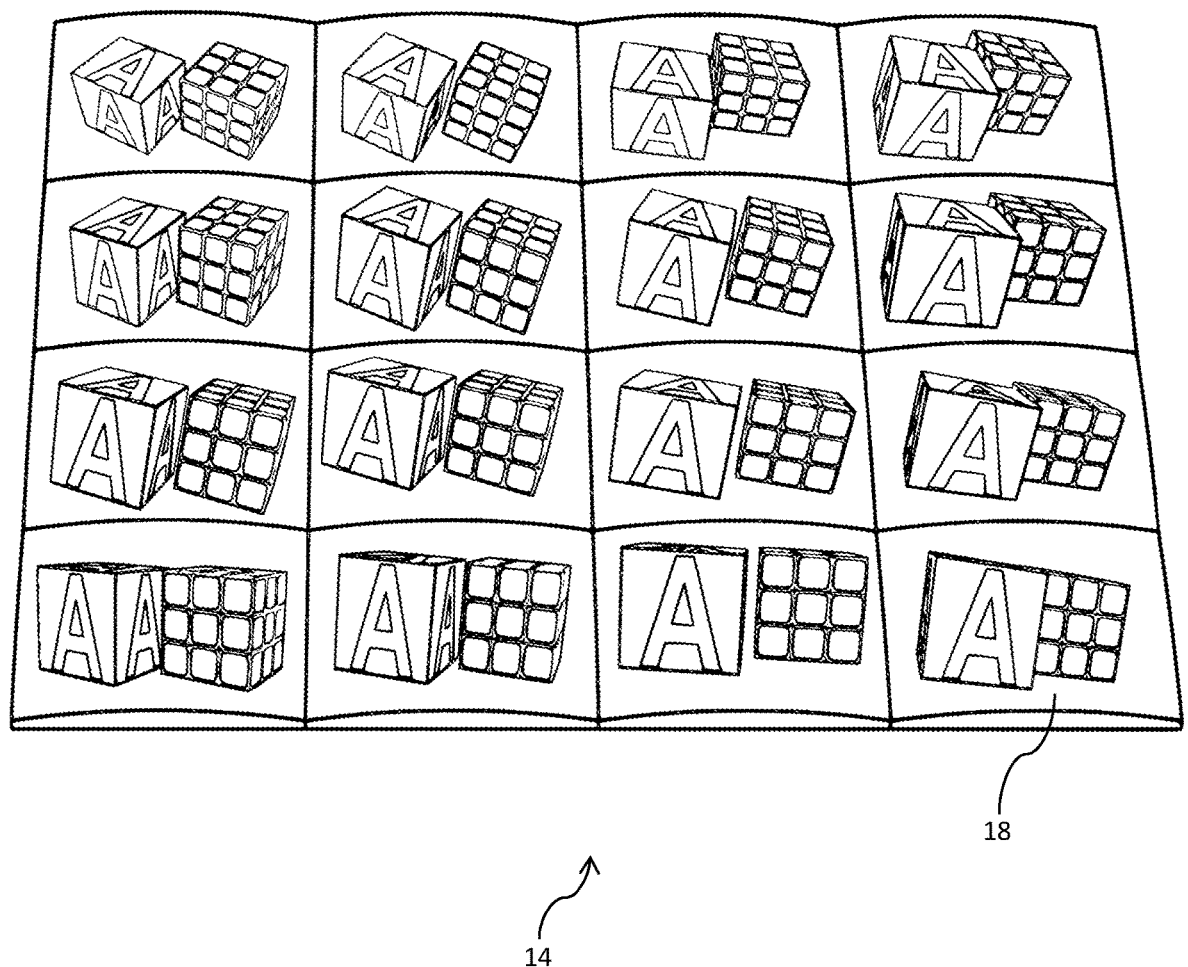
FIGS. 7a and 7b demonstrates a schematic view of full-parallax configuration where the optical elements are structured in array format (a) and when the optical elements are dense (~1mm), in which case the full-parallax system becomes true 3D (integral imaging).
Figure 7B:
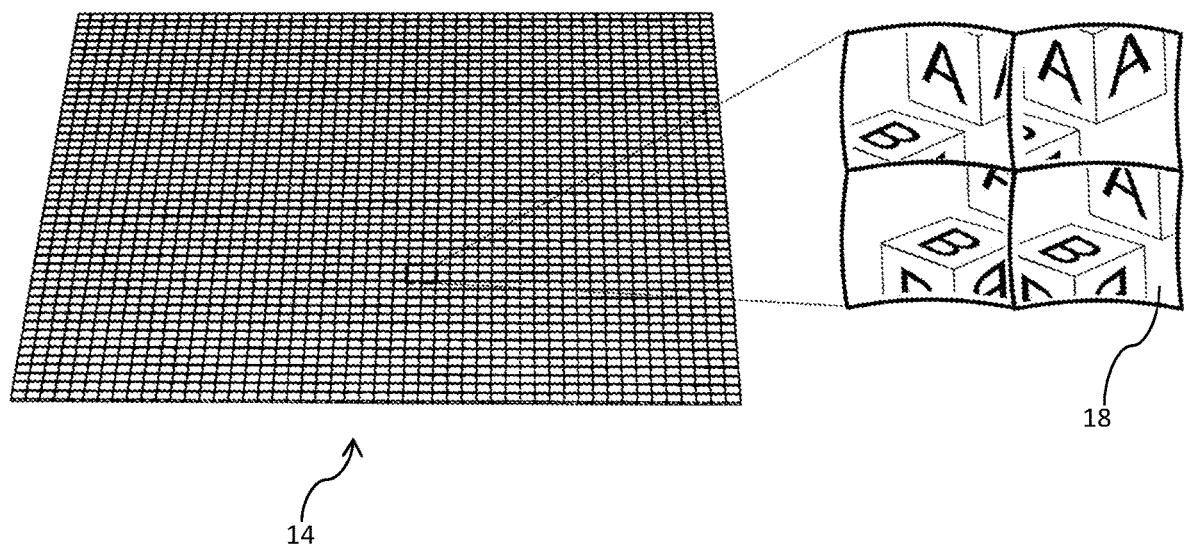
Figure 7C:
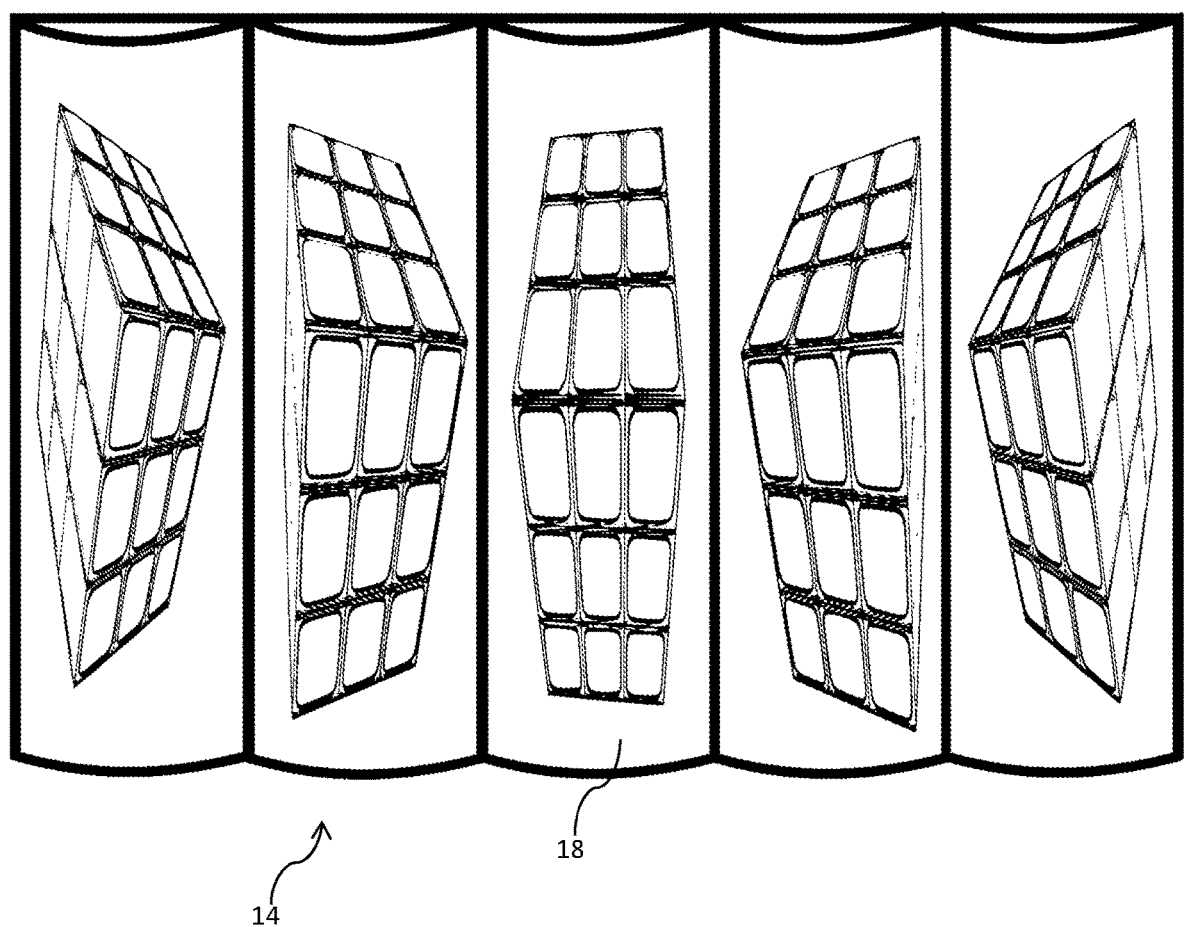
FIGS. 7c and 7d demonstrates schematic views of horizontal-parallax-only configuration (HPO) where the optical elements are structured to extend longitudinally along the vertical axis so as to be neighboring each other on the horizontal direction instead of full-parallax configuration where the optical elements are structured in array format.
Figure 7D:
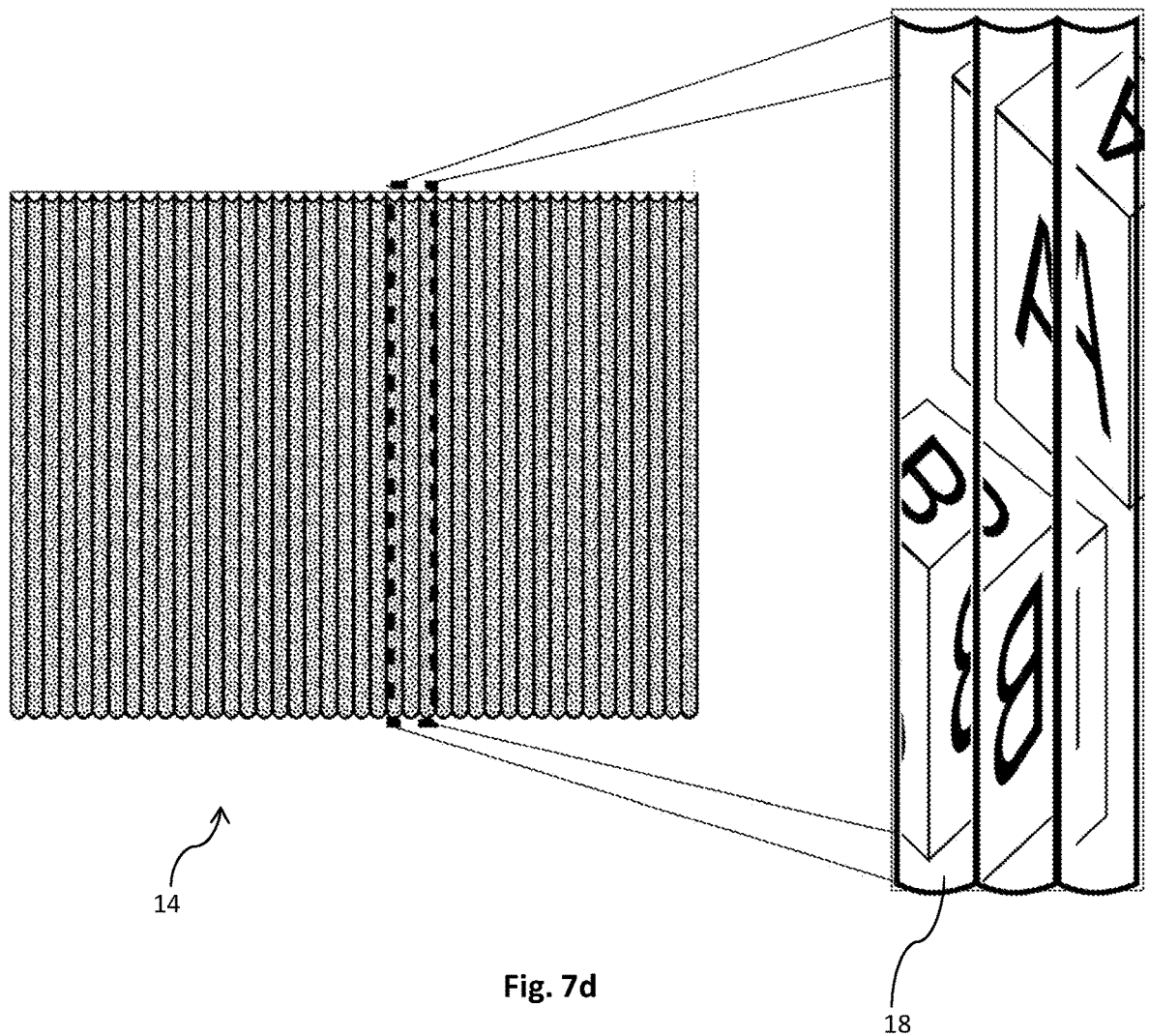
Figure 8:
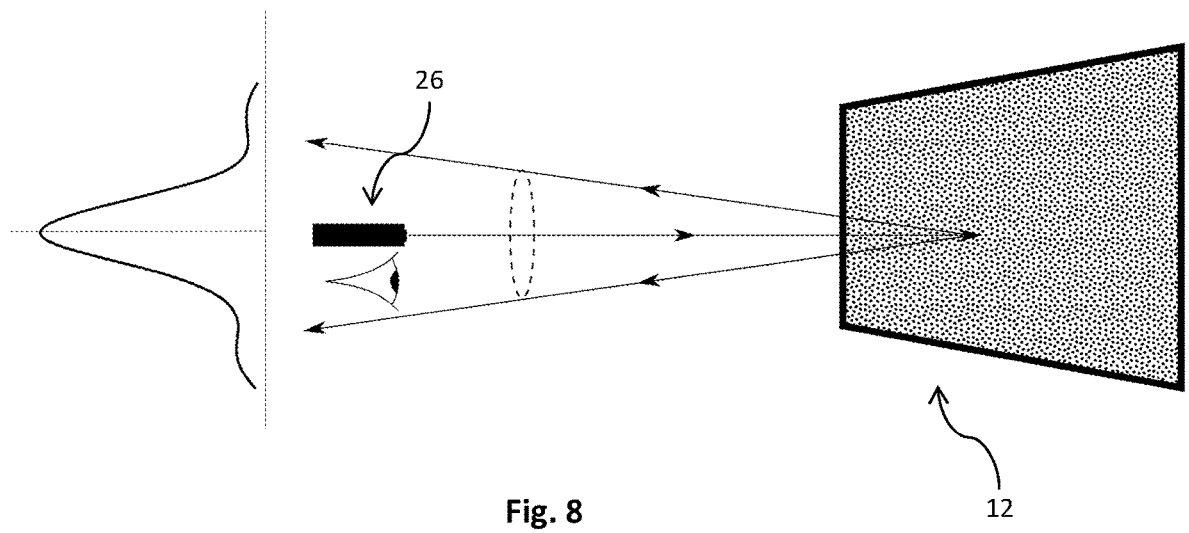
FIG. 8 demonstrates a schematic view of retro-reflection cone angle emanating from a projection screen incorporating microspheres in a range of small (10 pm) to larger (100 pm) sizes to provide better viewing at eye position.
Figure 9A:
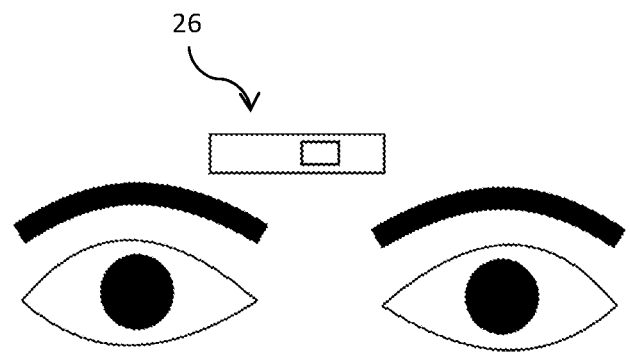
FIGS. 9a, 9b, 9c, 9d and 9e respectively demonstrate different configurations with a single projecting assembly (2D) placed between eyes (a), a single projector assembly (2D) placed in between two eyes with polarized glasses to reject ambient light reflections (b), a single projecting assembly placed between eyes with polarized glasses using mixed polarization technique to realize stereoscopic 3-D viewing (c), two projector units for each eye to realize autostereoscopic 3-D viewing (d), and two projector units for each eye to realize autostereoscopic 3-D with additional pair of beam splitters to align optical axis of eye and projector units (e). The multi-view optical system as described above can be configured on a head-mountable device (28) or a tabletop device using beam splitters (34) in front of the eyes.
Figure 9B:
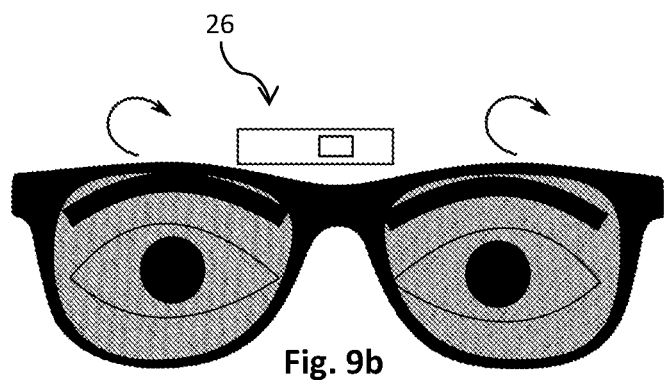
Figure 9C:
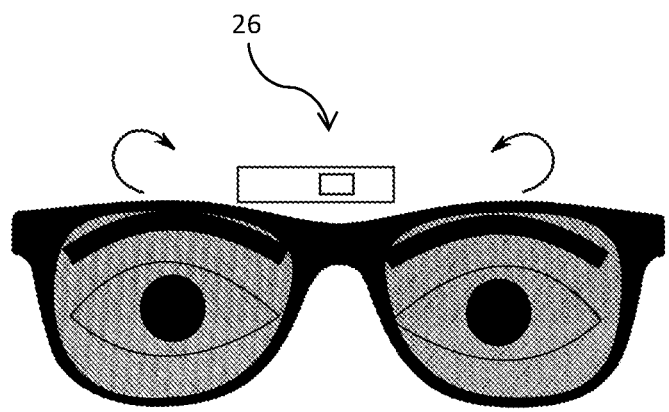
Figure 9D:
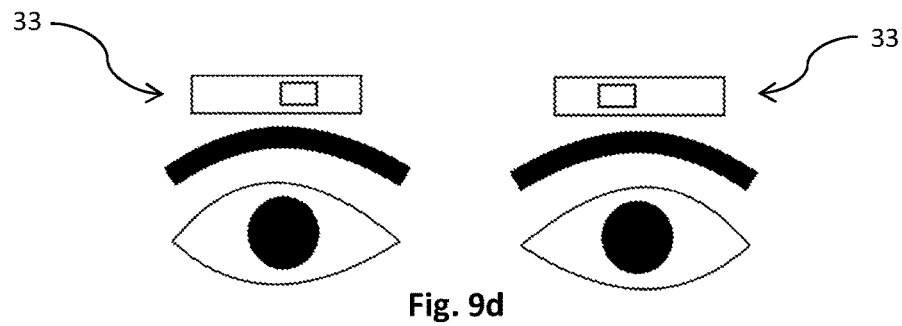
Figure 9E:
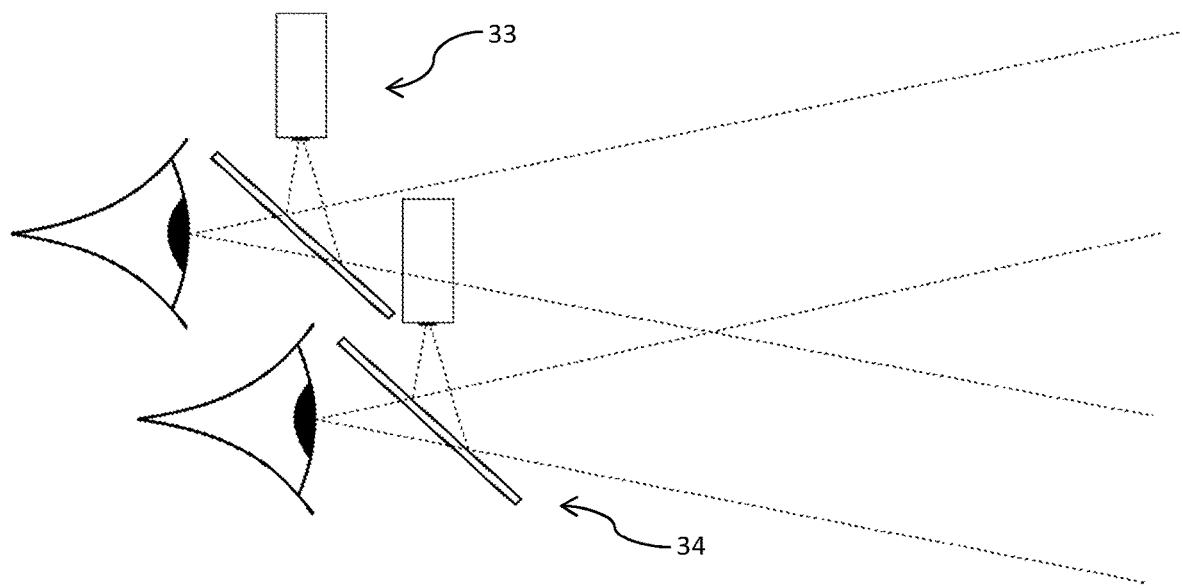
Figure 10A:
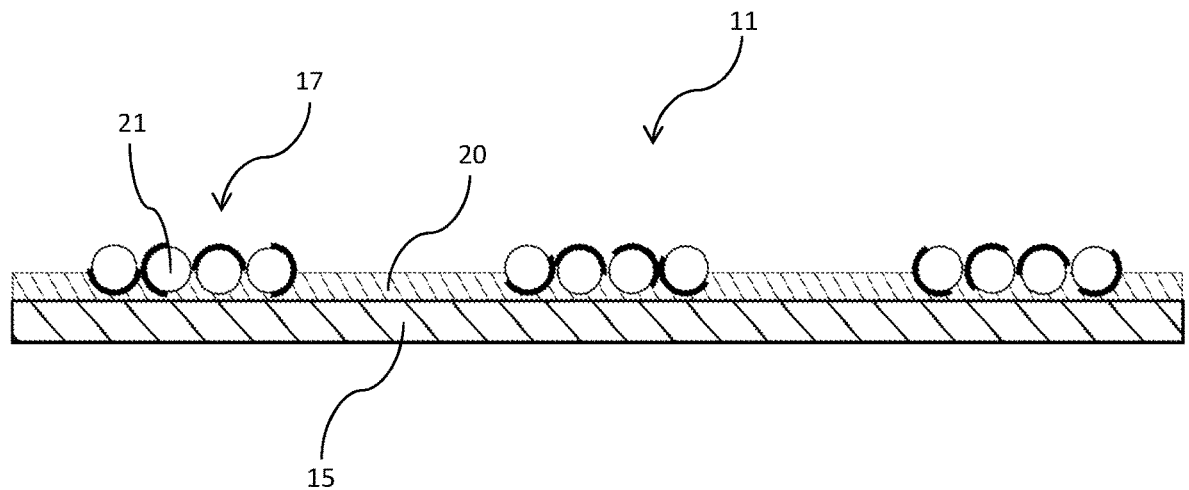
FIG. 10a demonstrates another schematic view of a passive screen with a display layer having randomly-orientated half-coated microbeads and a transparent passive screen substrate.
Figure 10B:
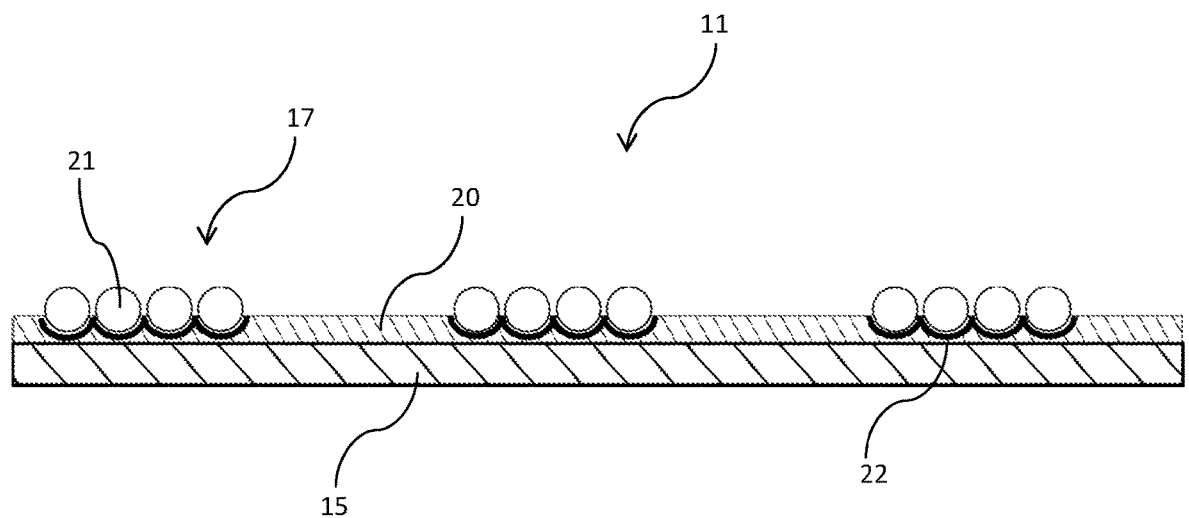
FIG. 10b demonstrates another schematic view of a passive screen with a display layer having uniformly-orientated reflectively bottom-coated microbeads (rear-reflective coating) and a transparent passive screen substrate. Both figures depict a semi-transparent retroreflective cell configuration.
Figure 11A:
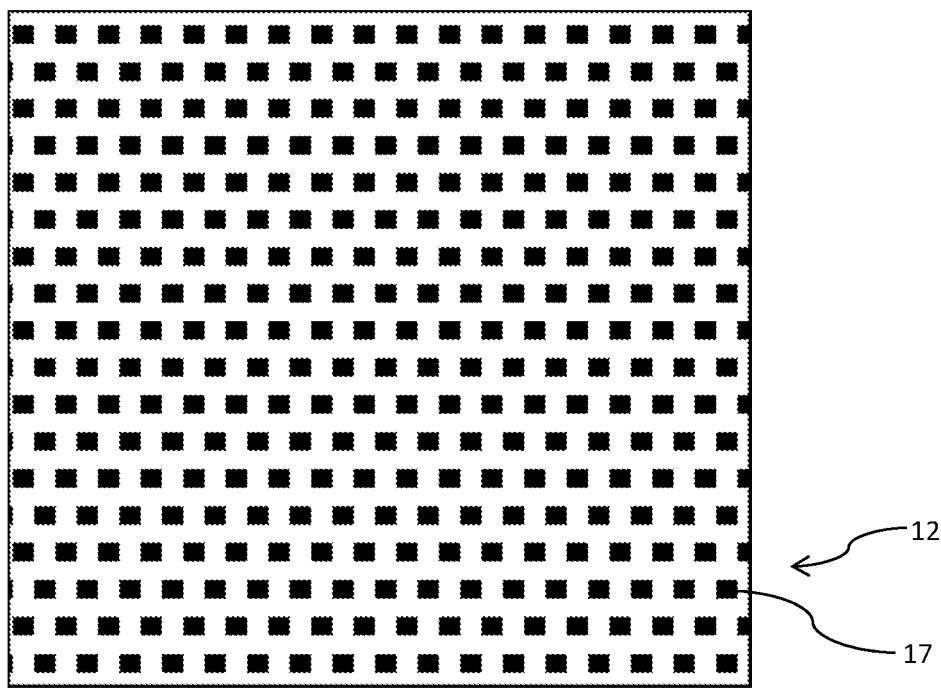
FIGS. 11a and 11b demonstrate schematic views of the halftone high-gain retroreflective display layer with display cells in the form of square or circular shaped display cells (which can also be rectangular elements or stripes), display cells being evenly distributed as hexagonally disposed or randomly distributed display cells. The distribution can be hexagonal, dithered, vertical/horizontal etc.
Figure 11B:
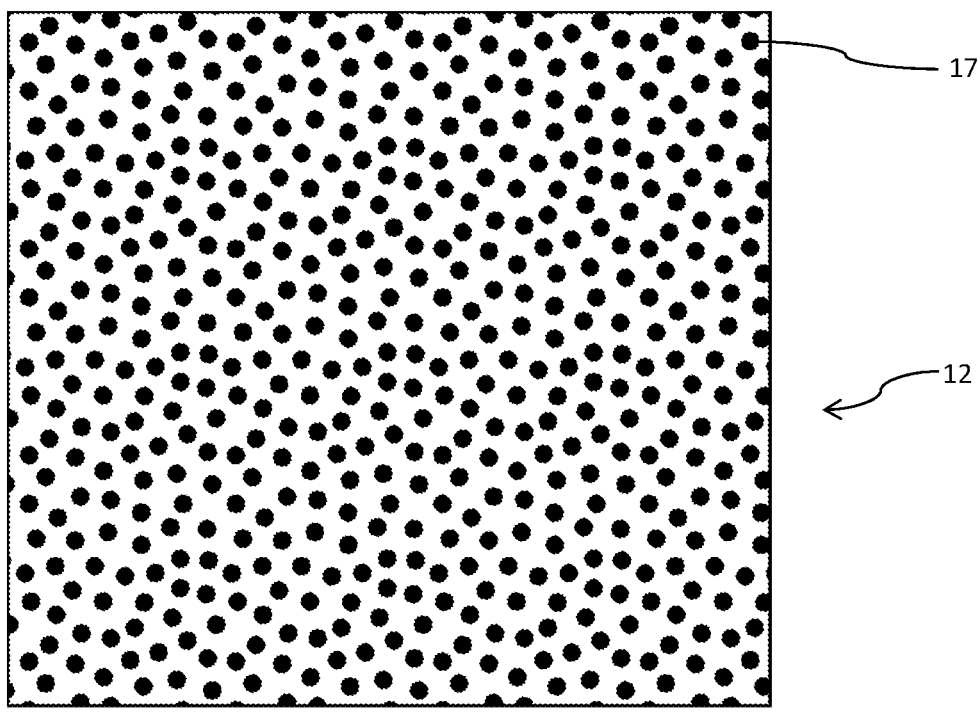
Figure 11C:
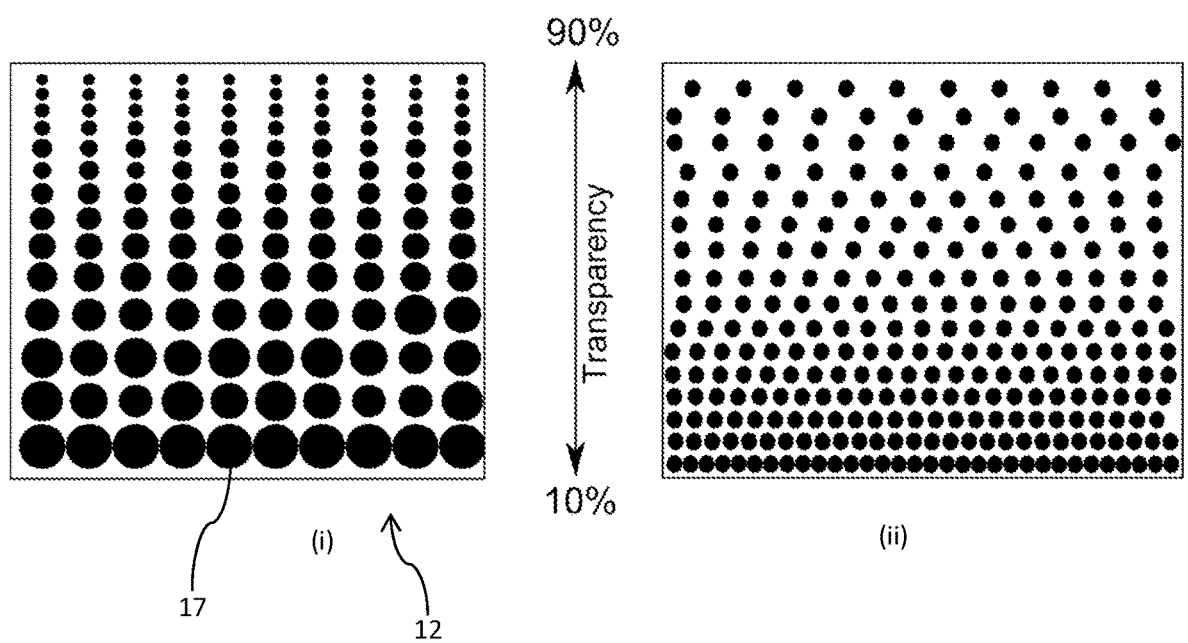
FIG. 11c demonstrates a configuration with circular display cell patterns whose halftone density/transparency is arrangeable, the effective area of retro-reflective display cells being controlled by changing the cell size (i) or display cell pitch (ii) in order to get a transparency range of 10-90%.

The display layer (12) of the passive screen (11) comprises display patches in the form of retroreflective display cells (17) or diffusive metal coatings. The display layer (12) preferably comprises retroreflective display cells (17) such that a semi-transparent mask made of display cells (17) of retroreflective microspheres (or microbeads, 21) provides retro-reflection. The display cells (17) of microspheres (21) are coated on the imaging layer (14) preferably having a specular surface. The reflective layer formed by the retroreflective display cells (17) or diffusive metal coatings can be generally expressed as a reflective coating (19) that is generally shown in FIGS. 5 and 6 together with the imaging layers (14).

Retroreflective display cells (17) are optionally made of hemi-spherically coated glass microspheres (21) spread over an adhesive layer (20) in a randomly-oriented manner, the adhesive layer (20) containing a pressure-sensitive or radiation curable (UV) adhesive/resin. Retro-reflection can be alternatively achieved through tightly placing transparent microspheres (21) on a microspheres reflective coating (22) as a thin (approximately 100 nm) metallic (preferably Aluminum) film and pressure sensitive adhesive/resin.

The effective area of the passive screen (11) functioning in optical communication with the projector assembly (26) can cover 10-80% percent of the total area. Preferably, at least 10% of the screen area of the passive screen (11) is retro-reflective and is used as a display layer (12). Retro-reflection cone angle emanating from a single microsphere (21) can be improved by using microspheres (21) in a range of small (10μm) to larger (100μm) sizes to provide better viewing at eye position. The diameter of the microspheres (21) is preferably in the range of 30 to 100μm. Further, the halftone retroreflective display cells (17) made of hemi-spherically coated randomly-oriented glass microspheres (21) or of transparent microspheres (21) placed on the microspheres reflective coating (22) and adhesive layer (20) have a certain size in the manner that the retroreflective display cells (17) are made small enough not to be seen granular viewed from a comfortable viewing distance (0.5 m or higher). The halftone retroreflective display cells' (17) pitch can be smaller than 1 mm or even 250μm so that it cannot be resolved by the eye. The retroreflective display cells' (17) pattern preferably has a pitch period of 400μm to 1 mm with a duty cycle of 20% to 50%.

The surface pattern of the display cells (17) in the display layer (12) of the passive screen (11) can have various configurations. The high-gain retroreflective display layer (12) may have display cells (17) in the form of circular or square-shaped cell portions being evenly distributed as linearly aligned, hexagonally disposed or randomly distributed cells. Therefore, while the shape of the display cells (17) can be circular or square/rectangular, the distribution pattern can be square, hexagonal, dithered or in the form of vertical/horizontal strips. Randomly-distributed patches are especially effective in eliminating Moire-pattern artifacts.

Alternatively, the display layer (12) of the passive screen (11), instead of having retroreflective display cells (17), can be realized by way of utilizing diffusive metal coatings. In this case, a low-gain and wide-angle display layer (12) will be obtainable. In the case of diffusive metal coatings, the projector assembly (26) may be advantageously disposed apart from the user, therefore eliminating the need for the combined use of the image capturing device (16) and the projector assembly (26) in the head-mountable device (28).

Figure 12A:
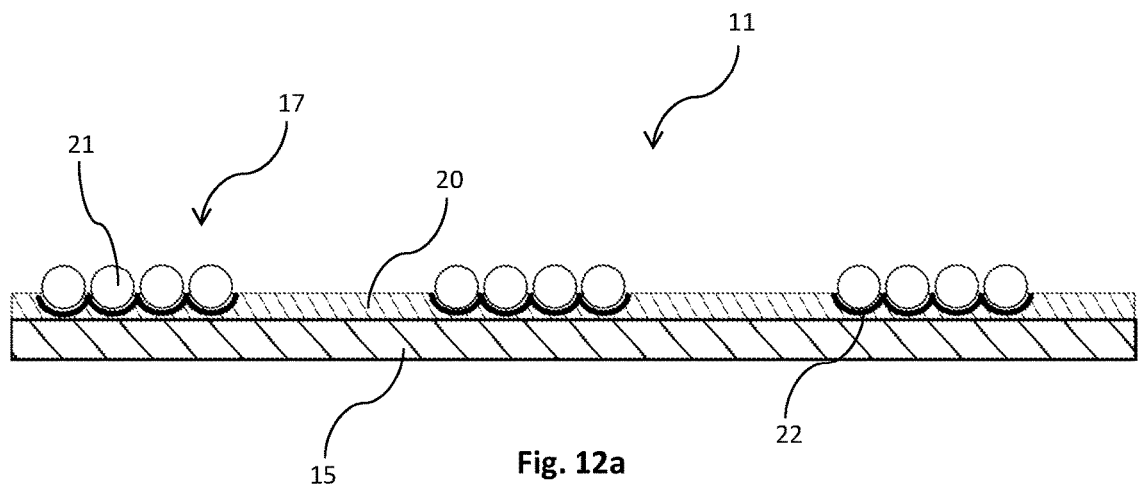
FIGS. 12a and 12b demonstrate schematic views of a projection display layer and screen substrate for semi-transparent retroreflective display cell configuration (a) and a micro-lens array layer with wavelength selective notch coating over a screen substrate layer configuration (b). A transparent protective layer (23) can be used.
Figure 12B:
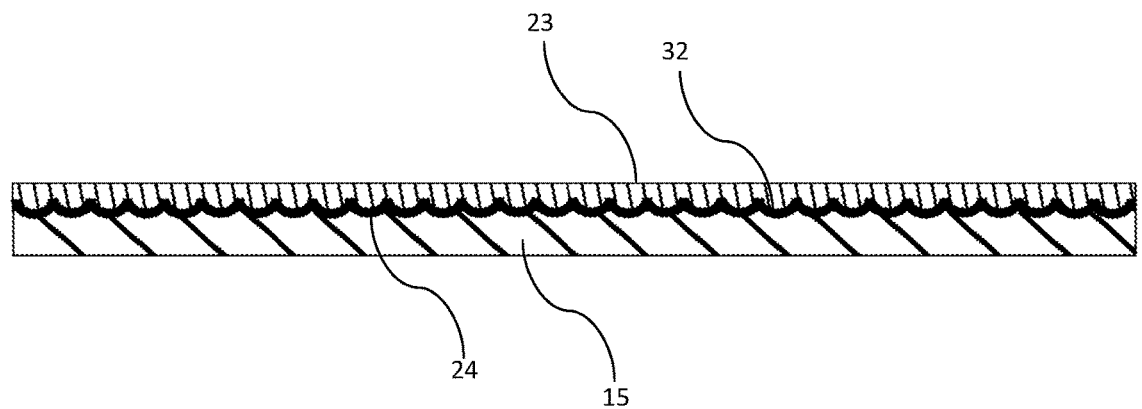
Figure 12C:
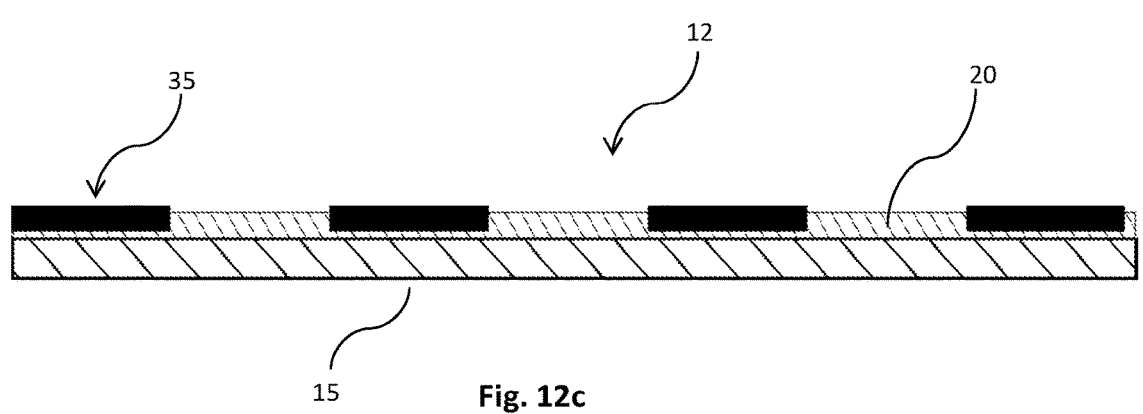
FIG. 12c demonstrates a schematic view of a display layer with diffusive display cells (diffusive layer (35)).
Figure 13A:
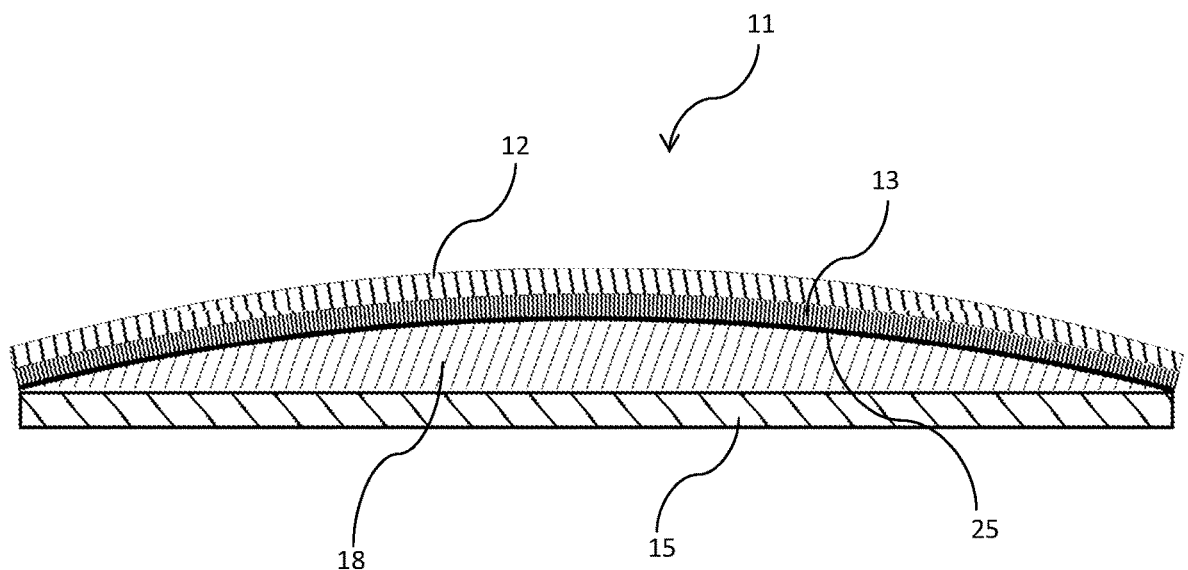
FIGS. 13a and 13b demonstrate schematic views of a display layer (retroreflective, diffusive or MLA screen) with a blocking layer (Polarizer) and an imaging layer (optical element layer), the latter in the form of a refractive/reflective layer with convex (a) or concave (b) lens/mirror configuration.
Figure 13B:
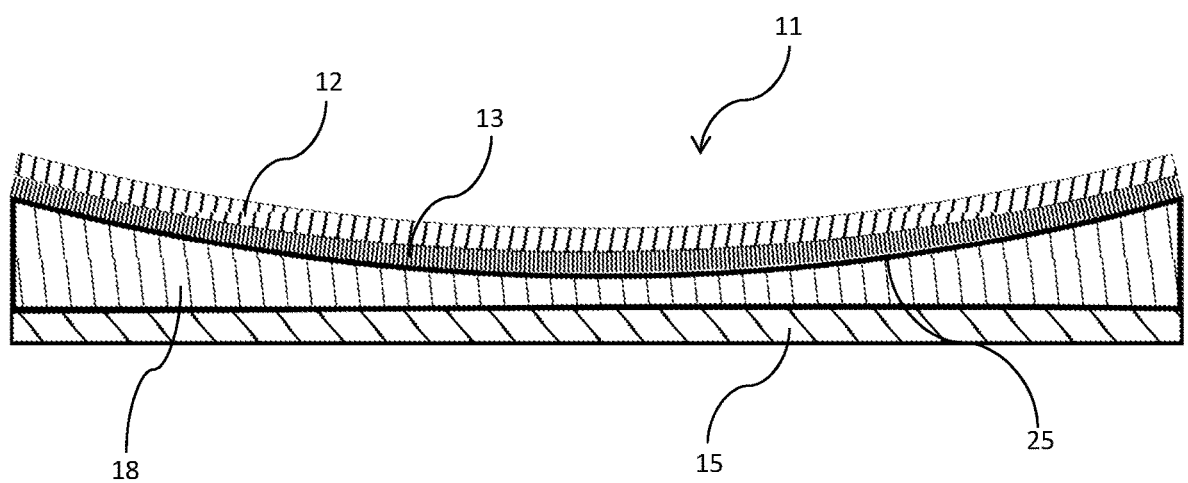
Figure 13C:
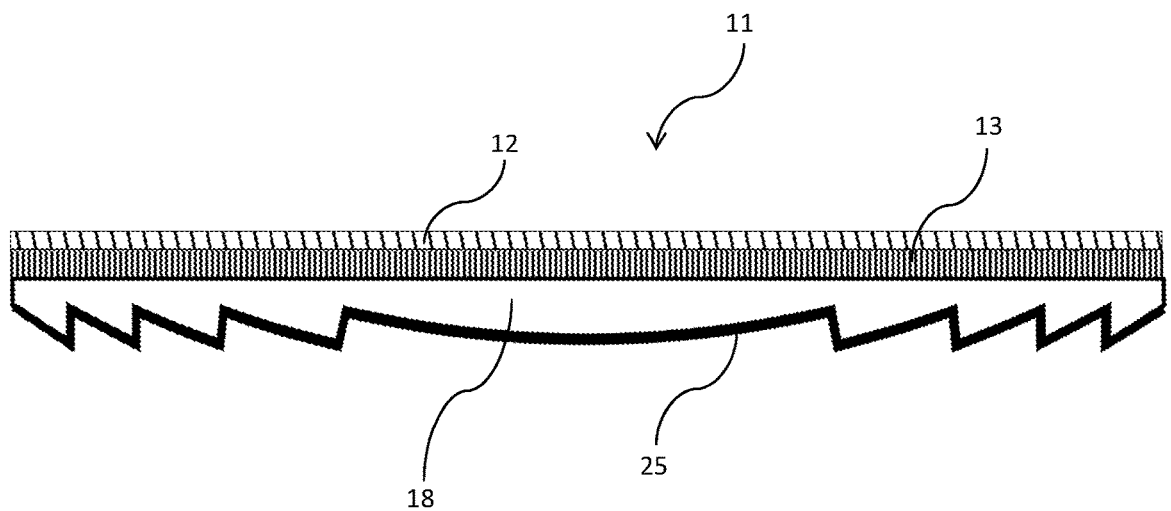
FIGS. 13c and 13d demonstrate schematic views of a display layer (retroreflective or MLA screen) with a blocking layer (Polarizer) and an imaging layer (optical element layer), the latter in the form of a positive Fresnel lens/mirror (c) or negative Fresnel lens/mirror (d) configuration. A reflective coating (19) can be employed in association with the Fresnel lens element.
Figure 13D:
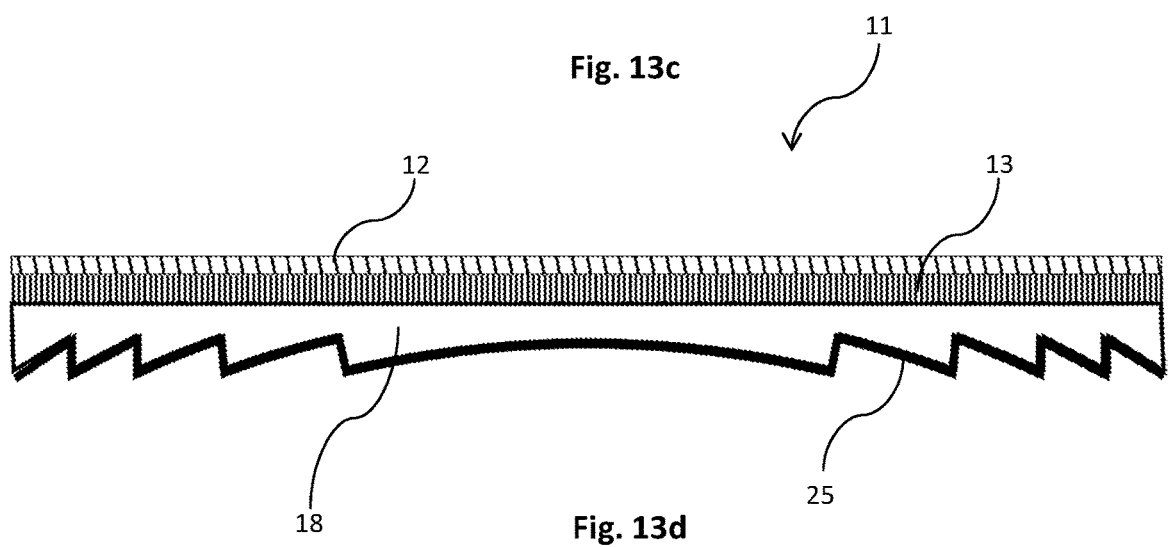
Figure 14:
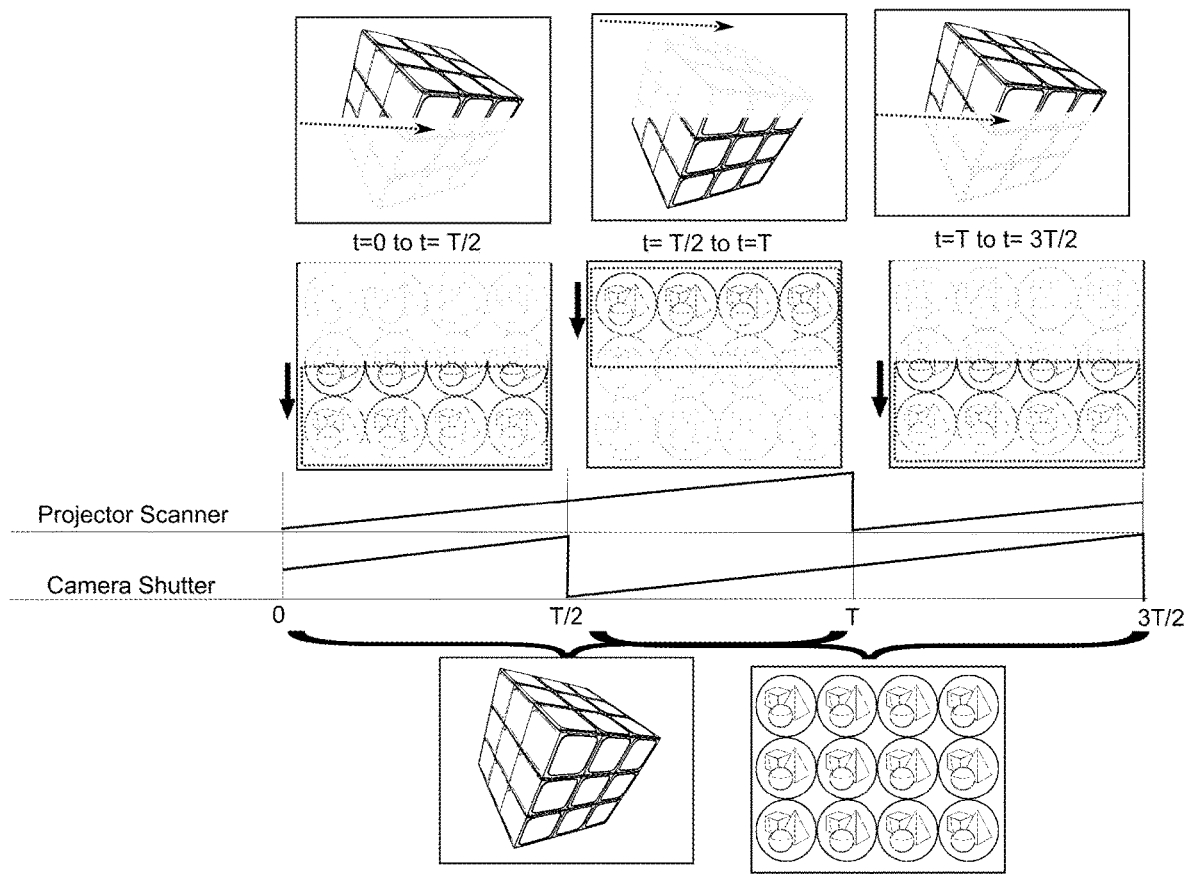
FIG. 14 demonstrate a schematic view of time division multiplexing between image capturing device and projector assembly to allow simultaneous image capture and image display according to an alternative embodiment.

Alternatively, as seen in FIG. 12b, a micro-lens array (24) as a separate layer being placed on top of the imaging layer (14) is used as a display layer (12).

The micro-lenses in the micro-lens array (24) have a wavelength-selective (reflective) notch coating (32). With such coatings, in accordance with the present embodiment, micro-lenses can reflect the projector light and function as a transparent screen, the transparency of the passive screen (11) being used to capture image formations through optical elements (18).

In accordance with a further embodiment, image formations originating from the imaging layer (14) of the passive screen (11) are eliminated through polarization multiplexing by means of a blocking layer (13) in the form of a polarizer sheet. Therefore, polarization glasses worn by the user will prevent him from seeing his image formations on the passive screen (11) while the image capture device (16) will continue to detect these image formations through said imaging layer (14) of the passive screen (11). In other words, said blocking layer (13) placed on the imaging layer (14) polarizes light collected from the scene passing through uncoated sections of the passive screen (11) where no retroreflective display cells (17) are present and the formed multi-perspective images are collected by the image capturing device (16). The polarization multiplexing method enabling simultaneous use of the passive screen (11) for imaging as well as displaying purposes is effected in the manner that the projector assembly's (26) light is polarized in one specific direction and the image capturing device (16) captures only specifically polarized light. For instance, the projector assembly's (26) light is horizontally polarized and the image capturing device (16) captures vertically polarized light only or the projector assembly's (26) light is left circularly polarized and the image capturing device (16) captures right circularly polarized light only. When using one projector to project 2D content on the passive screen (11), polarized glasses in front of eye rejects the ambient reflections for the viewer. Projector's light source polarization axes and polarizer's polarization axes can be selected for 3D operation mode or ambient rejection.

Additionally, time-division multiplexing method can also be employed to enable shared use of the passive screen (11) for imaging and displaying purposes, in which configuration the image capturing device's (16) shutter is time-synchronized with the projection beam scanner of the projector assembly (26). In this case, a phase delay of 180 degrees is added between the projection beam scanner signal and the image capturing device (16) shutter signal.

The image capturing device (16) and the passive screen (11) together with the imaging layer (14), the latter being combined with the display layer (12), communicates with the projector assembly (26) such that the latter projects any of the images captured by the image capturing device (16) in a reconstructed manner so that the user can view a preferred view of the scene as captured.

The combination of the imaging layer (14) with the display layer (12) may comprise a display layer (12) having display cells (17) of retroreflective material and an array of optical elements (18) (for instance as flat mirrors) neighboring each other in an equally distanced manner, preferably by a distance less than or equal to the IPD. Alternatively, a very dense array of optical elements (18) as flat mirrors can be used. The blocking layer (13) is interposed between the display layer (12) and the imaging layer (14). In further exemplary combinations, the flat mirrors can be replaced by optical elements (18) in the form of convex or concave mirrors, refractive lenses, Fresnel lenses (27) or Fresnel mirrors. It is of special significance that an imaging layer (14) having Fresnel lenses (27) or Fresnel mirrors will enable manufacturing of a passive screen (11) by way of using flat and flexible polymeric materials.

A first telepresence sub-system (30) comprising a first head-mountable device (28) with a first image capturing device (16) and a first projector assembly (26), both of which in optical communication with a first passive screen (11), can remotely communicate with a second telepresence sub-system (31) with a second head-mountable device (28) having a second image capturing device (16) and a second projector assembly (26), both of which in optical communication with a second passive screen (11). In this particular telepresence system (29), more than one user can communicate with each other in the manner that a first user can view a second user on the first passive screen (11) and the second user can view the first user on the second passive screen (11). The telepresence system (29) advantageously provides a visually improved and more realistic teleconferencing experience by which the users can view one another in different angles in a dynamically changeable manner depending on viewing axes of the viewing or viewed users. In other words, the first user changing his viewing axis by moving his head sideways or changing his viewing angle by tilting his head to a certain direction can view the other user from another angle with a more realistic perspective effect. The same analogy also applies if not the first user but the second user moves his head in a particular manner, in which case the first user standing still also views a more realistically improved series of reconstructed images of the second user. Robust direction- and motion-sensing, accurate recognition of movement and the calculation of orientation and rotation of the first and second head-mountable devices (28) can be effected by a gyroscope preferably combined with accelerometers. The first and second head-mountable devices (28) are conventionally capable of communicating with each other by way of establishing a remote network connection.

Alternatively, the first and second passive screens (11) can be equipped with additional, power-supplied viewing position control modules effecting direct or progressive multi-view scrolling for instance in the form of trackers, touch pads etc. These peripheral modules preferably in wireless communication respectively with said first and second head-mountable devices (28) can be equally advantageous to allow the users to directly fine-tune the viewing positions and/or angles themselves.

While synthesizing multi-perspective views, various image processing algorithms as is known to the skilled worker in the literature can be used to generate 3-D content to be displayed on the display layer (12) of the passive screen (11). While the projector assembly (26) may have a single projector placed between the eyes of the user to effectuate 2-D image projection, 3-D content generation can be performed by a pair of projector units (33), each being placed on top of an eye. In this case, autostereoscopic view can be obtained through spatial multiplexing by the two projectors. Alternatively, an additional beam splitter (34) can be used to provide stereoscopic viewing via polarization multiplexing. Optical filter coatings can be added on retroreflective display layer (12) to reflect only RGB laser wavelengths.

In sum, according to the disclosed system, different screen substrates (15) with arrays of different optical elements (18) can be used. The head-mountable device (28) with the projector assembly (26) can be configured to display 2D/3D image content. The projection display layer (12) can be in the form of a semi-transparent projection screen with high-gain retroreflective elements (display cells (17)). Surface distribution of the display cells (17) is also configurable. The projection display layer (12) can alternatively be in the form of a micro-lens array (24). The imaging layer (14) can have optical elements (18) in the form of catadioptric/reflective (mirror) elements, dioptric/refractive (lens) elements or thin, flat surface (Fresnel Lens (27)) elements. According to exemplary embodiments, a flat passive screen (11) can be manufactured with a Fresnel lens (27) array and a display layer (12). A flat passive screen with an array of Fresnel lenses (27) may have half-coated microspheres (21) or transparent microspheres (21) having microspheres reflective coatings (22). The passive screen (11) may have a display layer (12) with half-coated or transparent microspheres (21) and for instance with a mirror screen substrate (15).

An optional coating layer (25) can be used as demonstrated in FIGS. 13a to 13d. This optional coating layer (25) can be an anti reflection coating, reflective coating, wavelength selective such as dichroic reflective coating, or partially reflective coating such as thin metal layer or a dielectric stack.

In a nutshell, the multi-view imaging system proposes a display and imaging system comprising an image capturing device (16), a projector assembly (26) and a passive screen (11), said image capturing device (16) capturing at least one view being formed by said passive screen (11) in optical communication therewith. In one embodiment, said image capturing device (16) is in optical communication with said passive screen (11) in the manner that an imaging layer (14) of said passive screen (11) having a two-dimensional optical element (18) array forms at least one view of a scene on one side thereof, the at least one view of the scene being formed by a respective optical element (18) of the imaging layer (14) being captured by the image capturing device (16), said image capturing device (16) simultaneously capturing at least one view of the scene as individually formed by an optical element (18) in the optical element array, said imaging layer (14) acting as an image forming medium of the scene.

In a further embodiment, the projector assembly (26) projects images on the passive screen (11) having a display layer (12) for effecting displaying of the projected images thereon in the manner that the passive screen (11) simultaneously forms the at least one view of the scene as formed by said imaging layer (14) and displays the images as projected by the projector assembly (26).

In a further embodiment, said image capturing device (16) comprises a high-resolution camera.

In a further embodiment, said optical elements (18) of the imaging layer (14) are reflective, refractive, diffractive elements or a combination thereof.

In a further embodiment, said optical elements (18) of the imaging layer (14) are reflective or refractive lens elements, mirror elements or diffractive Fresnel lenses (27). In a further embodiment, said optical elements (18) of the imaging layer (14) are lens elements or mirror elements separated in discrete steps by a distance equal to or less than an average interpupillary distance (IPD) value.

In a further embodiment, said optical elements (18) of the imaging layer (14) are configured to provide full-parallax or horizontal-parallax-only views.

In a further embodiment, said optical elements (18) of the imaging layer (14) are configured to provide horizontal-parallax-only views such that they are structured to extend longitudinally along a first direction and so as to be neighboring each other on a second direction perpendicular to the first direction.

In a further embodiment, the passive screen's (11) imaging layer (14) is provided with an array of optical elements (18) in the form of an optical element array disposed such that neighboring optical elements (18) are separated in discrete steps by approximately 4 to 75 mm.

In a further embodiment, the passive screen's (11) imaging layer (14) is provided with an array of optical elements (18) in the form of a microelement array disposed in a substantially dense configuration such that neighboring micro-elements are separated in discrete steps by approximately 0.5 to 4 mm.

In a further embodiment, said optical elements (18) of the imaging layer (14) are placeable on a screen substrate (15). In a further embodiment, said screen substrate (15) is a parabolic base to bring optical axes of the optical elements (18) facing parallel towards to the scene being reflected in a parabolic screen and parallel field of view configuration. In a further embodiment, said screen substrate (15) is a flat base as a flat screen in a diverging field of view configuration. In a further embodiment, said screen substrate (15) is a spherical concave base in a converging field of view configuration or a convex base in a diverging field of view configuration.

In a further embodiment, the optical elements (18) of the imaging layer (14) are placeable on a flexible screen substrate (15).

In a further embodiment, the optical elements (18) placeable on a flexible passive screen substrate (15) are Fresnel lenses (27).

In a further embodiment, the optical elements (18) have different optical axes tilted towards the image capturing device (16) with specified focal lengths and optical power.

In a further embodiment, the passive screen (11) is a portable medium or wall-mountable assembly in optical cooperation with a position-adjustable image capturing device (16). In a further embodiment, the image capturing device (16) is a position-adjustable device in the form of a table-top device, a ground-standing device, a corner mount security camera or a centrally suspended or disposed 3-D camera. In a further embodiment, the image capturing device (16) is incorporated into a head-mountable device.

In a further embodiment, the image capturing device (16) comprises an image processing unit synthesizing different views being obtained to dynamically reconstruct the scene as a sequence of reconstructed images using image processing algorithms. In a further embodiment, the image capturing device (16) and the projector assembly (26) are incorporated into a head-mountable device (28) or a position-adjustable device or they are separately respectively incorporated into the head-mountable device (28) and the position-adjustable device.

In a further embodiment, the projector assembly (26) comprises a high-resolution pico-projector. In a further embodiment, the passive screen (11) comprises two discrete superposed structures separately simultaneously displaying the projected images in optical cooperation with the projector assembly (26) and forming multi-perspective views in optical cooperation with the image capturing device (16).

In a further embodiment, the passive screen's (11) imaging layer (14) and display layer (12) constitute separate screen portions of the passive screen (11) in an interwoven manner. In a further embodiment, the passive screen's (11) display layer (12) is structured in the form of a micro-patterned retroreflective surface.

In a further embodiment, at least 10% of the screen area of the passive screen (11) is retroreflective and is used as a display layer (12) and at most 90% of the screen area thereof is used as an imaging layer (14) for perspective image formations.

In a further embodiment, the display layer (12) of the passive screen (11) comprises display patches in the form of retroreflective display cells (17), diffusive metal coatings or a micro-lens array (24). In a further embodiment, retroreflection is provided by a semi-transparent mask made of display cells (17) of retroreflective microspheres (21). In a further embodiment, the display cells (17) of microspheres (21) are coated on the imaging layer (14).

In a further embodiment, the retroreflective display cells (17) are made of hemi-spherically coated glass microspheres (21) spread over an adhesive layer (20) in a randomly-oriented manner.

In a further embodiment, the adhesive layer (20) is a pressure-sensitive or radiation curable (UV) adhesive/resin. In a further embodiment, the retroreflective display cells (17) are made of transparent microspheres (21) tightly placed on a microspheres reflective coating (22) and pressure sensitive or radiation curable (UV) adhesive/resin. In a further embodiment, the microspheres reflective coating's (22) width is approximately in the range of 75 to 125 nm.

In a further embodiment, the microspheres reflective coating (22) is a metallic and preferably Aluminum film.

In a further embodiment, microspheres (21) in a range of size of 10μmτι to 100μmτι are used whereby the retroreflection cone angle emanating from a single microsphere (21) is optimized. In a further embodiment, microspheres (21) have a certain size in the manner that the retroreflective display cells (17) are made sufficiently small to prevent granular viewing from a viewing distance of at least 25 cm.

In a further embodiment, the halftone retroreflective display cells' (17) pitch is smaller than 1 mm and preferably at least 250μmτι.

In a further embodiment, the retroreflective display cells' (17) pattern has a pitch period of 400 μm to 1 mm with a duty cycle of 20% to 50%. In a further embodiment, the retroreflective display cells' (17) distribution pattern is in the form of evenly distributed, linearly aligned square, hexagonally disposed, dithered, vertical/horizontal strips or randomly distributed patches. In a further embodiment, the retroreflective display cells' (17) shape is in the form of circular or square-shaped patch portions.

In a further embodiment, the image formations originating from the imaging layer (14) of the passive screen (11) are eliminated through polarization multiplexing by means of a blocking layer (13) in the form of a polarizer sheet.

In a further embodiment, said blocking layer (13) placed on the imaging layer (14) polarizes light collected from the scene passing through uncoated sections of the passive screen (11) where no retroreflective display cells (17) are present and the formed multi-perspective images are collected by the image capturing device (16).

In a further embodiment, the projector assembly's (26) light is polarized in one specific direction and the image capturing device (16) captures only specifically polarized light. In a further embodiment, the projector assembly's (26) light is horizontally polarized and the image capturing device (16) captures vertically polarized light only or the projector assembly's (26) light is left circularly polarized and the image capturing device (16) captures right circularly polarized light only.

In a further embodiment, the image capturing device's (16) shutter is time-synchronized with the projection beam scanner of the projector assembly (26) and a phase delay is added between the projection beam scanner signal and the image capturing device (16) shutter signal.

In a further embodiment, a micro-lens array (24) is placed on top of the imaging layer (14) as a display layer (12). In a further embodiment, the micro-lenses have a wavelength-selective notch coating (32).

In a further embodiment, the projector assembly (26) comprises a single projector unit (33) placeable along an axis between two eyes of a human.

In a further embodiment, the projector assembly (26) of the head-mountable device (28) comprises a pair of projector units (33), each being placed on top of a human eye.

In a further embodiment, the projector assembly (26) comprises an additional pair of beam splitters (34).

In a further embodiment, a display layer (12) comprising display cells (17) in the form of retroreflective display cells (17), diffusive metal coatings or a micro-lens array (24) is proposed, said display layer (12) being an at least partially see-through layer in the manner that images of a projector assembly (26) projecting images on a first side of the display layer (12) is at least partially juxtaposed with a scene on the second opposite side of said display layer (12). In a further embodiment, a method for manufacturing a display layer (12) having retroreflective display cells (17) is proposed, said method comprising the steps of applying pressure sensitive or radiation curable (UV) adhesive/resin to a substrate using a surface pattern having surface openings for receiving the pressure sensitive or radiation curable (UV) adhesive/resin, applying a microspheres reflective coating (22) on the surface openings containing pressure sensitive or radiation curable (UV) adhesive/resin and tightly placing transparent microspheres (21) on said microspheres reflective coating (22).

In a further embodiment, a telepresence system is proposed with a first telepresence sub-system (30) comprising a first head-mountable device (28) with a first image capturing device (16) and a first projector assembly (26), both of which in optical communication with a first passive screen (11), said first telepresence sub-system (30) remotely communicating with a second telepresence sub-system (31) with a second head-mountable device (28) having a second image capturing device (16) and a second projector assembly (26), both of which in optical communication with a second passive screen (11) whereby a first user can view the second user on the first passive screen (11) and the second user can view the first user on the second passive screen (11). In a further embodiment, the first and second head-mountable devices (28) comprise respective inertial sensors.

In a further embodiment, the first and second head-mountable devices (28) are capable of communicating with each other by way of establishing a remote network connection. In a further embodiment, the first and second passive screens (11) comprise viewing position control modules effecting direct or progressive multi-view scrolling of multiple views.

In a further embodiment, the viewing position control modules establish respectively communicate with said first and second head-mountable devices (28).

In a further embodiment, a passive screen (11) comprising an imaging layer (14) and a display layer (12) is proposed.

The invention claimed is:

1. A display and imaging system comprising:
   an image capturing device, a projector assembly and a passive screen, said image capturing device in optical communication with said passive screen and configured to capture at least one view being formed by said passive screen;
   wherein said image capturing device is in optical communication with said passive screen in a manner that an imaging layer of said passive screen having a two-dimensional optical element array forms a plurality of views of a scene on one side thereof, said plurality of views of the scene being formed by respective optical elements of the imaging layer being captured by the image capturing device, said image capturing device simultaneously capturing said plurality of views of the scene as individually formed by optical elements in the optical element array, said imaging layer acting as an image forming medium of the scene,
   wherein the projector assembly is configurable to project images as projected images on the passive screen, the passive screen having an at least partially transparent display layer for effecting display of the projected images thereon in a manner that the passive screen simultaneously forms said plurality of views of the scene as formed by said imaging layer and displays the images as projected by the projector assembly,
   wherein the display layer and the imaging layer of the passive screen are two superposed layers separately serving for a purpose of simultaneously displaying the projected images in optical communication with the projector assembly and forming multi-perspective views in optical communication with the image capturing device and,
   wherein image formations originating from the imaging layer of the passive screen are eliminated either through polarization multiplexing by means of a further layer in the form of a blocking layer of the passive screen or through time-division multiplexing between the image capturing device and the projector assembly.

2. The display and imaging system as set forth in claim 1, wherein said optical elements of the imaging layer are reflective or refractive lens elements, mirror elements or diffractive Fresnel lenses.

3. The display and imaging system as set forth in claim 2, wherein said optical elements of the imaging layer are lens elements or mirror elements separated in discrete steps by a distance equal to or less than an average interpupillary distance (IPD) value.

4. The display and imaging system as set forth in claim 2, wherein said optical elements of the imaging layer are placeable on a screen substrate, said screen substrate being a parabolic base to bring optical axes of the optical elements facing parallel towards the scene being reflected in a parabolic screen and parallel field of view configuration, a spherical concave base in a converging field of view configuration or a convex base in a diverging field of view configuration.

5. The display and imaging system as set forth in claim 2, wherein the optical elements of the imaging layer are placeable on a flexible screen substrate.

6. The display and imaging system as set forth in claim 2, wherein the optical elements have different optical axes tilted towards the image capturing device with pre-specified focal lengths and optical power.

7. The display and imaging system as set forth in claim 1, wherein the image capturing device is a position-adjustable image capturing device, and the passive screen is a portable medium or wall-mountable assembly in optical cooperation with the position-adjustable image capturing device.

8. The display and imaging system as set forth in claim 7, wherein the position-adjustable image capturing device is a table-top device, a ground-standing device, a corner mount security camera or a centrally suspended or disposed three-dimensional (3-D) camera.

9. The display and imaging system as set forth in claim 1, wherein the image capturing device is incorporated into a head-mountable device.

10. The display and imaging system as set forth in claim 1, wherein the imaging layer and the display layer of the passive screen constitute separate screen portions of the passive screen in an interwoven manner.

11. The display and imaging system as set forth in claim 10, wherein at least 10% of a screen area of the passive screen is retroreflective and is used as the display layer and at most 90% of the screen area is used as the imaging layer for perspective image formations.

12. The display and imaging system as set forth in claim 10, the image capturing device is configured to time-synchronized a shutter included in image capture device with a projection beam scanner of the projector assembly and by addition of a phase delay between a projection beam scanner signal and a shutter control signal generated by the image capturing device.

13. The display and imaging system as set forth in claim 1, wherein the display layer of the passive screen comprises display patches, the display patches comprising retroreflective display cells, diffusive metal coatings or a micro-lens array.

14. The display and imaging system as set forth in claim 13, wherein retro-reflection is provided by a semi-transparent mask made of the retroreflective display cells the retroreflective display cells comprising retroreflective microspheres.

15. The display and imaging system as set forth in claim 14, wherein the retroreflective display cells comprising reflective microspheres are coated on the imaging layer.

16. The display and imaging system as set forth in claim 13, wherein the retroreflective display cells are made of hemi-spherically coated glass microspheres spread over an adhesive layer in a randomly-oriented manner.

17. The display and imaging system as set forth in claim 1, wherein the projector assembly is configured to generate light polarized in one specific direction, wherein the light polarized in the one specific direction is horizontally polarized light, and the image capturing device is configured to capture only vertically polarized light, or wherein the light polarized in the one specific direction is left circularly polarized and the image capturing device is configured to capture only right circularly polarized light.

18. The display and imaging system as set forth in claim 1, wherein the projector assembly is incorporated into a head-mountable device, the head-mountable device comprising a pair of projector units, each being placed on top of a human eye.

19. A display and imaging system comprising a first telepresence sub-system and a second telepresence sub-system, the first telepresence sub-system comprising a first head-mountable device with a first image capturing device and a first projector assembly, both of which are in optical communication with a first passive screen, said first telepresence sub-system configured to remotely communicate with said second telepresence sub-system, said second telepresence sub-system comprising a second head-mountable device having a second image capturing device and a second projector assembly, both of which are in optical communication with a second passive screen, such that a first user of the first telepresence sub-system is viewable by a second user of the second telepresence sub-system on the second passive screen and the second user is viewable by the first user on the first passive screen wherein;

said first and second telepresence sub-systems are respectively configured to effectuate multiple-view imaging of the first and second users in different angles, and display of the first and second users in the respective second and first passive screens at different angles in a dynamically changeable manner in accordance with a respective viewing axes of the first and second user viewing or being viewed.

\* \* \* \* \*